US012164248B2

(12) United States Patent
Usui et al.

(10) Patent No.: US 12,164,248 B2
(45) Date of Patent: Dec. 10, 2024

(54) IMAGE FORMING APPARATUS THAT SELECTIVELY CHANGES TRAILING END VOLTAGE

(71) Applicant: CANON KABUSHIKI KAISHA, Tokyo (JP)

(72) Inventors: Masatake Usui, Shizuoka (JP); Yusaku Iwasawa, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/946,857

(22) Filed: Sep. 16, 2022

(65) Prior Publication Data

US 2023/0092025 A1 Mar. 23, 2023

(30) Foreign Application Priority Data

Sep. 17, 2021 (JP) ................................ 2021-152690

(51) Int. Cl.
*G03G 15/16* (2006.01)

(52) U.S. Cl.
CPC ................................ *G03G 15/1675* (2013.01)

(58) Field of Classification Search
CPC ... G03G 15/1675; G03G 15/168; G03G 15/70
See application file for complete search history.

(56) References Cited

U.S. PATENT DOCUMENTS

| | | | | |
|---|---|---|---|---|
| 5,420,668 A * | 5/1995 | Okano | .................. | G03G 15/08 399/21 |
| 5,729,267 A | 3/1998 | Shimada et al. | | |
| 6,173,135 B1 * | 1/2001 | Yuminamochi | ...... | G03G 15/168 399/101 |
| 6,941,085 B2 * | 9/2005 | Nakano | ............... | G03G 15/168 399/101 |

(Continued)

FOREIGN PATENT DOCUMENTS

| | | |
|---|---|---|
| JP | 06-314035 A | 11/1994 |
| JP | 2002-055542 A | 2/2002 |
| JP | 2002-244456 A | 8/2002 |

(Continued)

OTHER PUBLICATIONS

U.S. Appl. No. 17/946,866, Masaki Hirose Taisuke Minagawa Yusaku Iwasawa, filed Sep. 16, 2022.

*Primary Examiner* — Arlene Heredia
(74) *Attorney, Agent, or Firm* — Venable LLP

(57) ABSTRACT

An image forming apparatus includes a rotatable photosensitive member, a charging member, a developing member, a transfer member, a voltage applying portion, and a controller. The controller is capable of changing a trailing end voltage to a first trailing end voltage lower than a transfer voltage applied to the transfer member by the voltage applying portion when a toner image is transferred from the photosensitive member to a recording material and to a second trailing end voltage higher than the first trailing end voltage. In an image forming operation after rotation of the (Continued)

photosensitive member is stopped in a state in which the image forming operation is not completed, the controller carries out control so that the second trailing end voltage is applied when a trailing end of the recording material with respect to a feeding direction passes through a transfer portion.

15 Claims, 10 Drawing Sheets

(56) References Cited

U.S. PATENT DOCUMENTS

| | | | |
|---|---|---|---|
| 9,354,587 | B2 | 5/2016 | Ikeda et al. |
| 11,378,901 | B2 | 7/2022 | Iwasawa et al. |

FOREIGN PATENT DOCUMENTS

| | | | |
|---|---|---|---|
| JP | 2009-186941 | A | 8/2009 |
| JP | 2014-056231 | A | 3/2014 |
| JP | 2015-099234 | A | 5/2015 |

* cited by examiner (a)

(b)

IMAGE FORMING APPARATUS THAT SELECTIVELY CHANGES TRAILING END VOLTAGE

FIELD OF THE INVENTION AND RELATED ART

The present invention relates to an image forming apparatus, such as a printer, a copying machine, or a facsimile machine, of an electrophotographic type.

Conventionally, in the image forming apparatus of the electrophotographic type, a surface of an electrophotographic photosensitive member having a drum shape in general is electrically charged by a charging means, and the charged surface of the photosensitive member is exposed to light by an exposure means, so that an electrostatic latent image is formed on the photosensitive member. Then, toner is deposited on the electrostatic latent image, formed on the photosensitive member, by a developing means, so that a toner image is formed on the photosensitive member and then is transferred onto a sheet-like recording material such as a recording sheet by a transfer means. Here, the recording material on which the image is formed in the image forming apparatus is referred to as "paper" in some instances, but is not limited to the paper. As the transfer means, a transfer roller which is a roller-like transfer member provided opposed to the photosensitive member and for forming a transfer nip (transfer portion) between itself and the photosensitive member in press-contact with the photosensitive member has been widely used. In this case, the recording material is fed to the transfer nip, and a transfer voltage of an opposite polarity to a normal charge polarity of the toner is applied to the transfer roller, so that charges are imparted to the recording material and thus the toner image on the photosensitive member is transferred onto the recording material.

When a current by electric discharge flows through between the photosensitive member and the transfer roller under application of the transfer voltage to the transfer roller, the surface of the photosensitive member is abraded. When the surface of the photosensitive member is abraded in a certain amount, the photosensitive member cannot maintain a charge performance and it therefore reaches an end of a lifetime thereof. Therefore, there is a method in which the voltage applied to the transfer roller is made lower (smaller) when a margin portion which is a non-image forming region of a trailing end portion of the recording material passes through the transfer nip than when an image forming region passes through the transfer nip (hereinafter, also referred to as "during transfer") (Japanese Laid-Open Patent Application No. 2002-55542). Here, the lowering (decrease) of the voltage relative to the transfer voltage during transfer includes that the voltage is made identical in polarity to and smaller in absolute value than the transfer voltage during transfer and that an applied voltage is made about 0 V or is changed to a voltage of an opposite polarity to the polarity of the transfer voltage during transfer.

Incidentally, a leading end and a trailing end for the recording material mean the leading end and the trailing end, respectively, with respect to a recording material feeding direction.

In the above-described method, the voltage applied to the transfer roller in a state in which the image forming region is not present in the transfer nip on and after the trailing end portion of the recording material passes through the transfer nip is made lower than the transfer voltage applied to the transfer roller when the image forming region passes through the transfer nip. Here, the state in which the image forming region is not present in the transfer nip on and after the trailing end portion of the recording material passes through the transfer nip corresponds to a period in which the margin portion of the trailing end portion of the recording material or a sheet (pass) interval region passes through the transfer nip. Further, a voltage, different from the transfer voltage applied to the transfer roller during transfer, applied to the transfer roller in the state in which the image forming region is not present in the transfer nip on and after the trailing end portion of the recording material passes through the transfer nip is also referred to as a "trailing end voltage". By using the trailing end voltage as described above, a potential difference between the surface of the photosensitive member and the transfer roller is made small, and the current by the discharge is reduced, so that abrasion of the surface of the photosensitive member is suppressed and thus lifetime of the photosensitive member is extended.

Incidentally, when jam (pass jam) of the recording material occurs in the image forming apparatus, the transfer roller is contaminated with toner in some cases. This is because an operation of the image forming apparatus is stopped by the jam, the toner on the photosensitive member to be transferred onto the recording material is transferred onto the transfer roller or because after the occurrence of the jam, the toner remaining on the photosensitive member is transferred onto the transfer roller during subsequent rotational operation of the photosensitive member.

The toner deposited on the transfer roller as described above (hereinafter, also referred to as "contamination toner") is electrically charged to a normal charge polarity. For that reason, during transfer of the toner image from the photosensitive member onto the recording material, the contamination toner is electrostatically attracted to the transfer roller to which the transfer voltage of the opposite polarity to the normal charge polarity of the toner is applied, so that the contamination toner is not readily transferred onto the recording material and thus the recording material is not readily contaminated with the contamination toner. On the other hand, as described above, in the trailing end portion of the recording material, when the voltage applied to the transfer roller is lowered for realizing lifetime extension by suppressing the abrasion of the surface of the photosensitive member or for the like purpose, a retaining force of the contamination toner by the transfer roller is weakened. For that reason, the contamination toner is transferred onto an edge (end surface) of the trailing end of the recording material, so that contamination of the edge (end) of the recording material with the toner (hereinafter, also referred to as "paper end contamination") occurs in some instances.

SUMMARY OF THE INVENTION

A principal object of the present invention is to provide an image forming apparatus capable of suppressing paper end contamination at a trailing end of a recording material in a constitution in which a trailing end voltage applied to a transfer member when the trailing end of the recording material passes through a transfer portion is controlled.

According to an aspect of the present invention, there is provided an image forming apparatus comprising: a rotatable photosensitive member; a charging member configured to electrically charge a surface of the photosensitive member; a developing member configured to form a toner image by supplying toner to the surface of the photosensitive member; a transfer member forming a transfer portion in contact with the surface of the photosensitive member and configured to transfer the toner image from the surface of the rotating photosensitive member onto a recording material passing through the transfer portion; an applying portion configured to apply a voltage to the transfer member; and a controller capable of executing control in which a trailing end voltage, applied to the transfer member by the applying portion when a trailing end of the recording material with respect to a feeding direction of the recording material passes through the transfer portion, is changed, wherein the controller is capable of changing the trailing end voltage to a first trailing end voltage smaller than a transfer voltage applied to the transfer member by the applying portion when the toner image is transferred from the photosensitive member to the recording material and to a second trailing end voltage larger than the first trailing end voltage in a direction of an opposite polarity to a normal charge polarity of the toner, and wherein in an image forming operation after rotation of the photosensitive member is stopped in a state in which the image forming operation is not completed, the controller carries out control so that the second trailing end voltage is applied when the trailing end of the recording material with respect to the feeding direction passes through the transfer portion.

Further features of the present invention will become apparent from the following description of exemplary embodiments with reference to the attached drawings.

Figure 4:
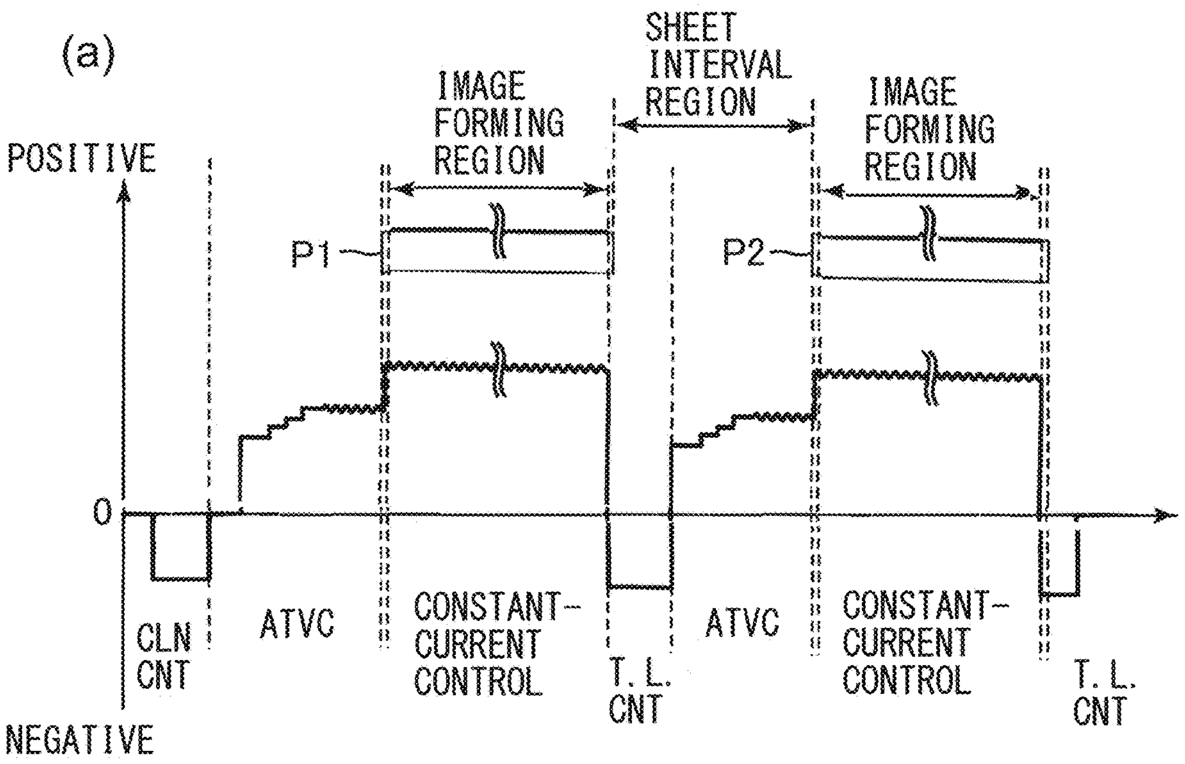
Figure 4:
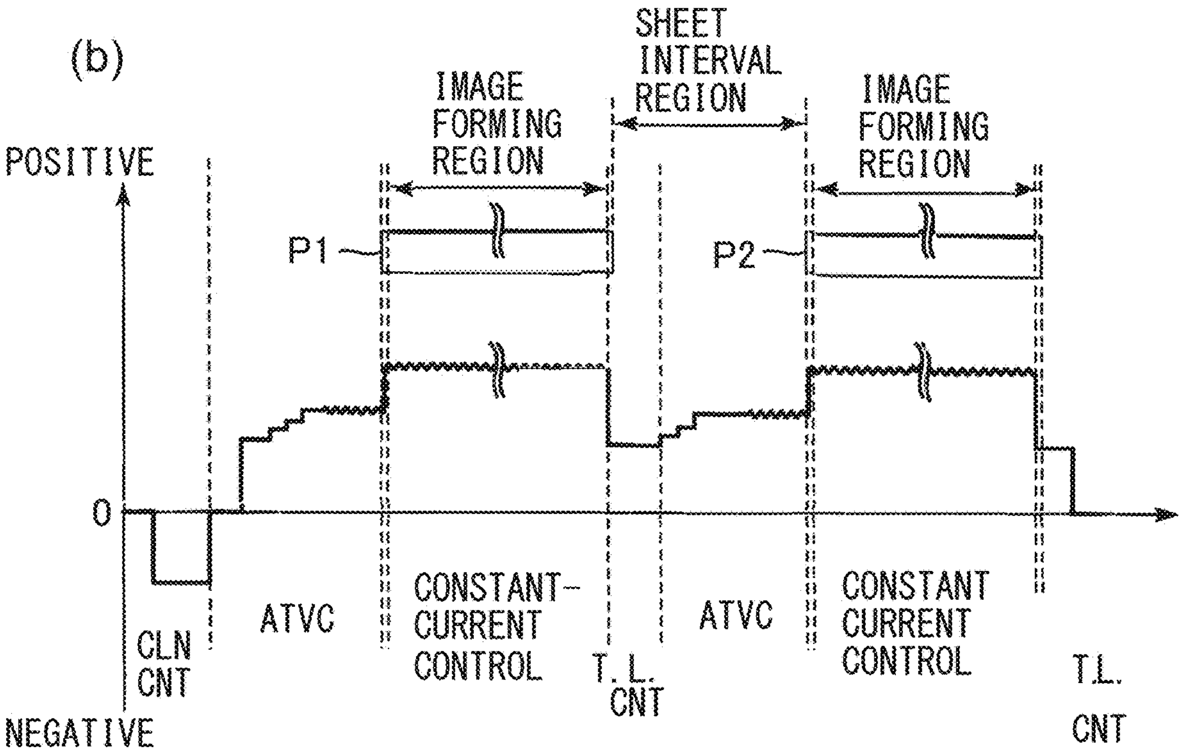

Parts (a) and (b) of FIG. 4 are timing charts each showing control of a voltage applied to a transfer roller.

Figure 5:
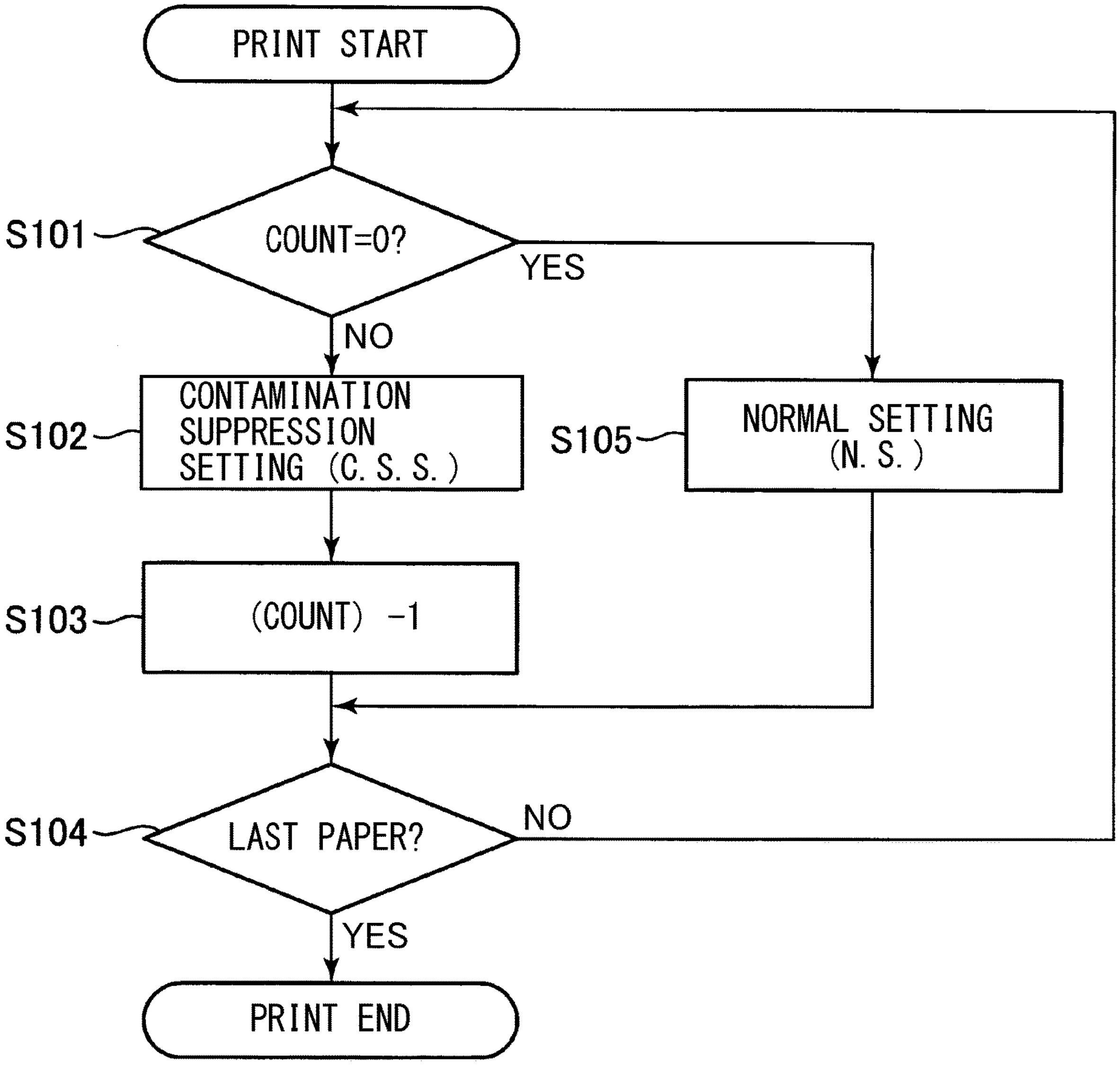

FIG. 5 is a flowchart showing a control procedure of the voltage applied to the transfer roller.

Figure 6:
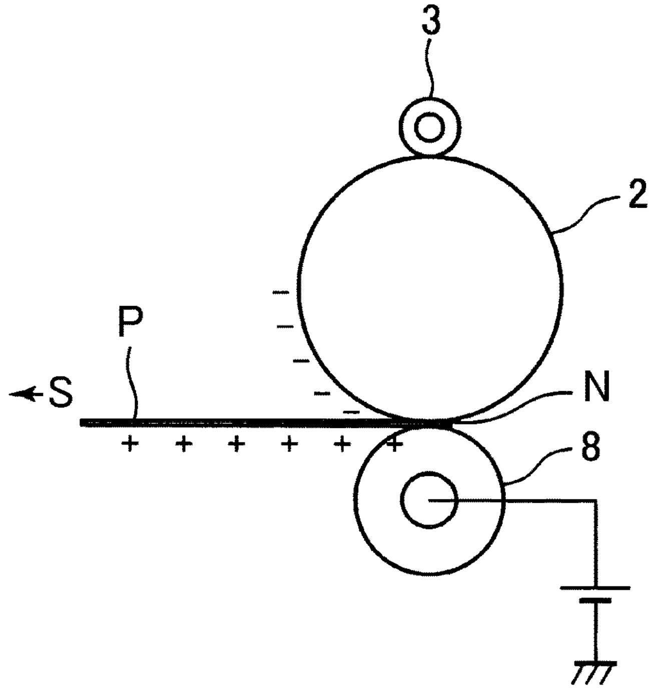
Figure 6:
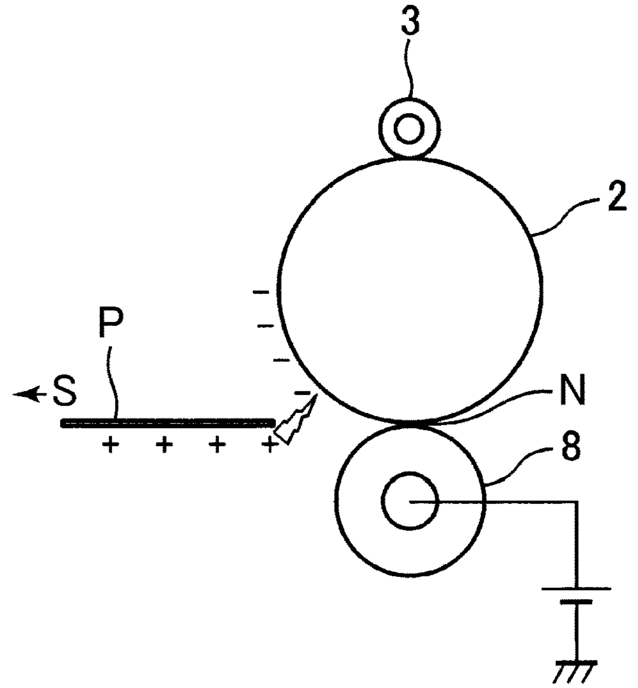

Parts (a) and (b) of FIG. 6 are schematic views for illustrating an occurrence mechanism of a trailing end memory.

Figure 7:
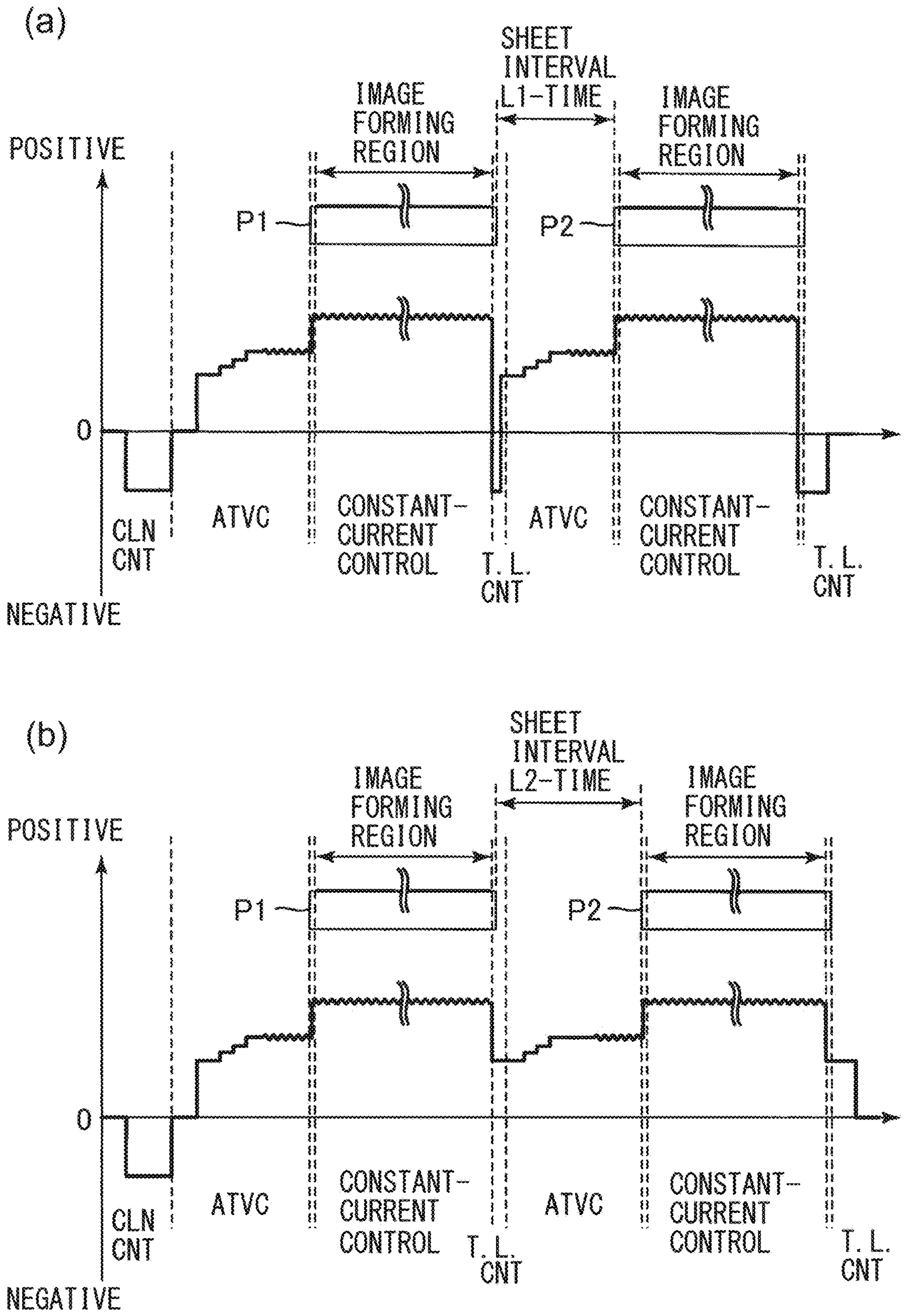

Parts (a) and (b) of FIG. 7 are timing charts each showing another example of the control of the voltage applied to the transfer roller.

Figure 8:
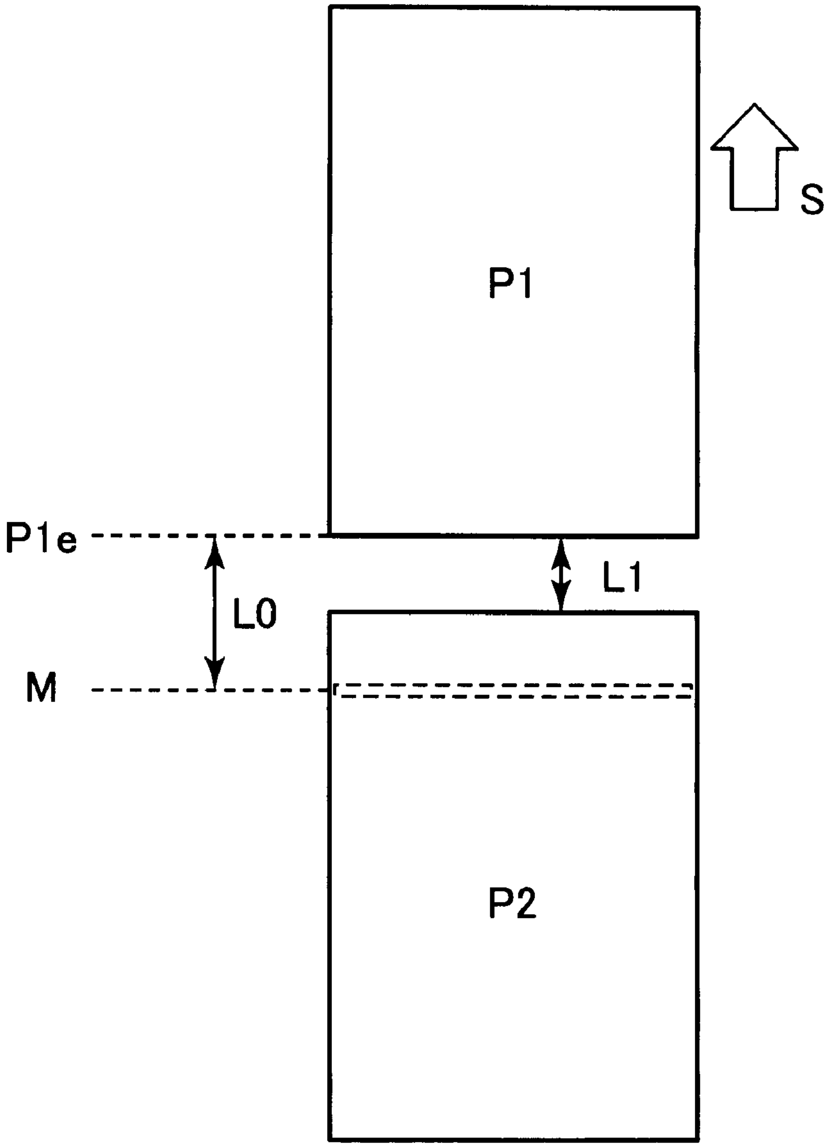

FIG. 8 is a schematic view for illustrating a trailing end memory occurrence position.

Figure 9:
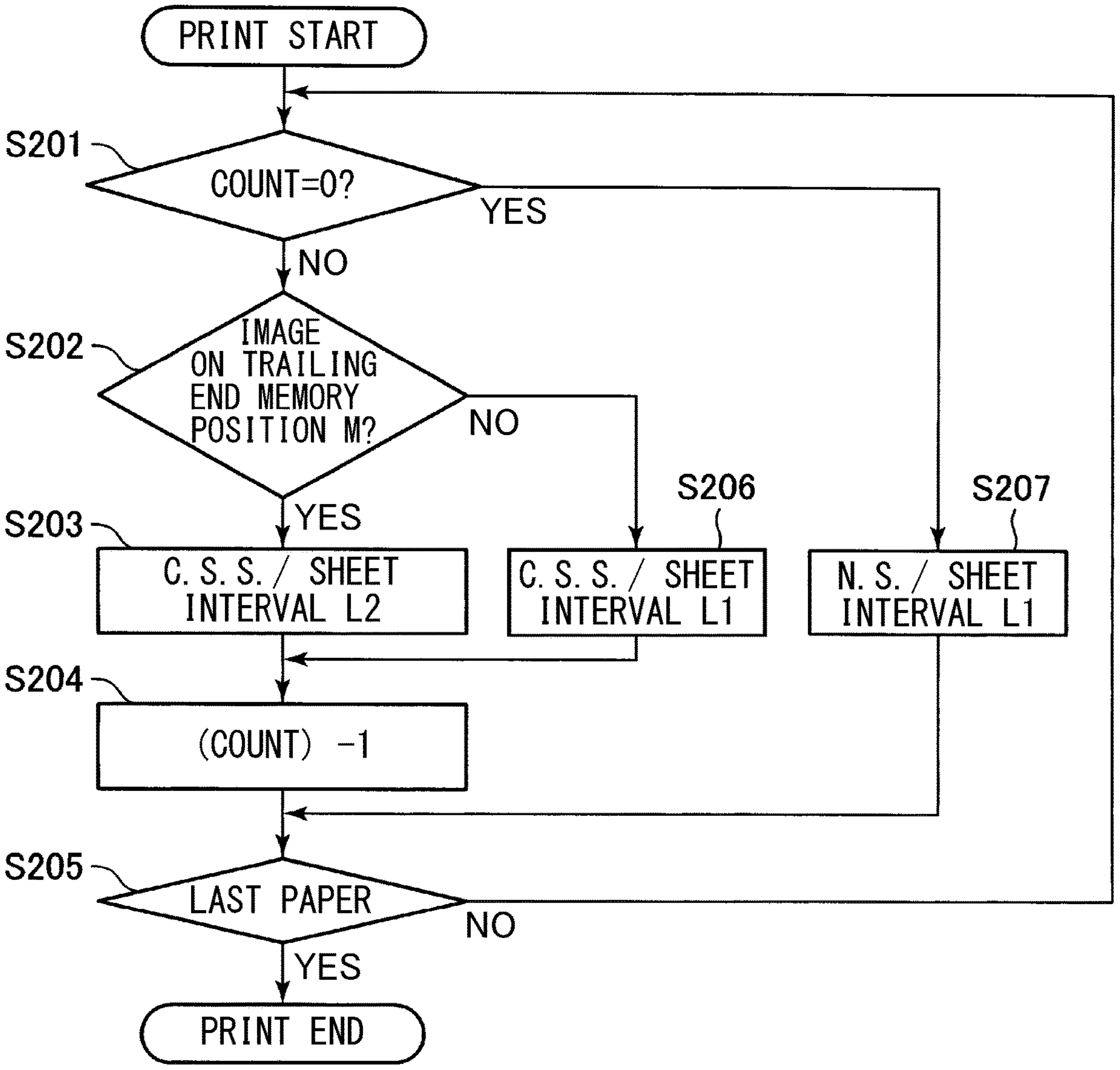

FIG. 9 is a flowchart showing another example of the control procedure of the voltage applied to the transfer roller.

Figure 10:
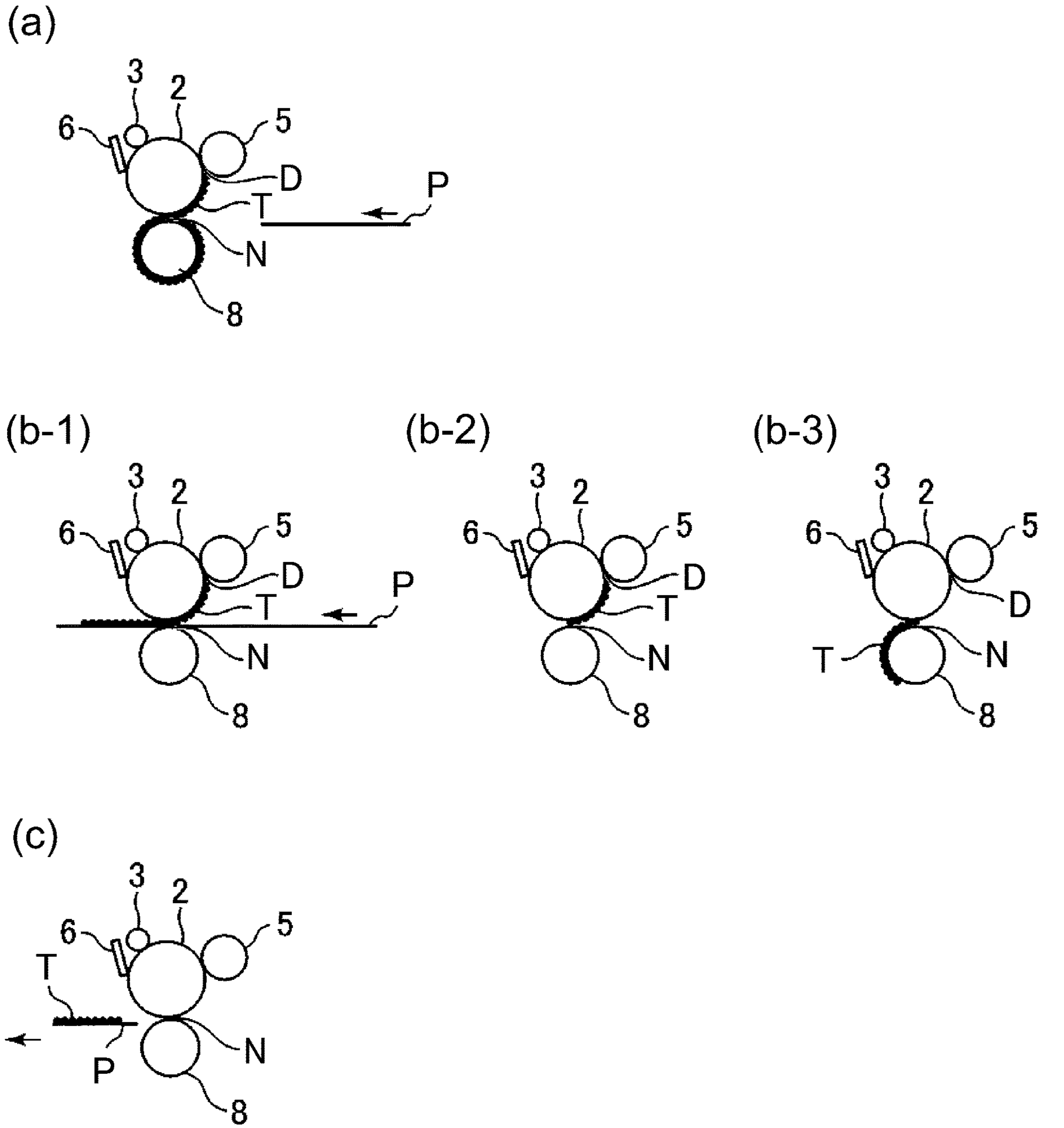

Parts (a), (b-1), (b-2), (b-3) and (c) of FIG. 10 are schematic views each showing a stop position of a recording material when a jam occurred.

DESCRIPTION OF THE EMBODIMENTS

In the following, an image forming apparatus according to the present invention will be described specifically with reference to the drawings.

1. General Constitution and Operation of Image Forming Apparatus

A general constitution and operation of an image forming apparatus 1 according to an embodiment 1 will be described with reference to FIG. 1.

Figure 1:
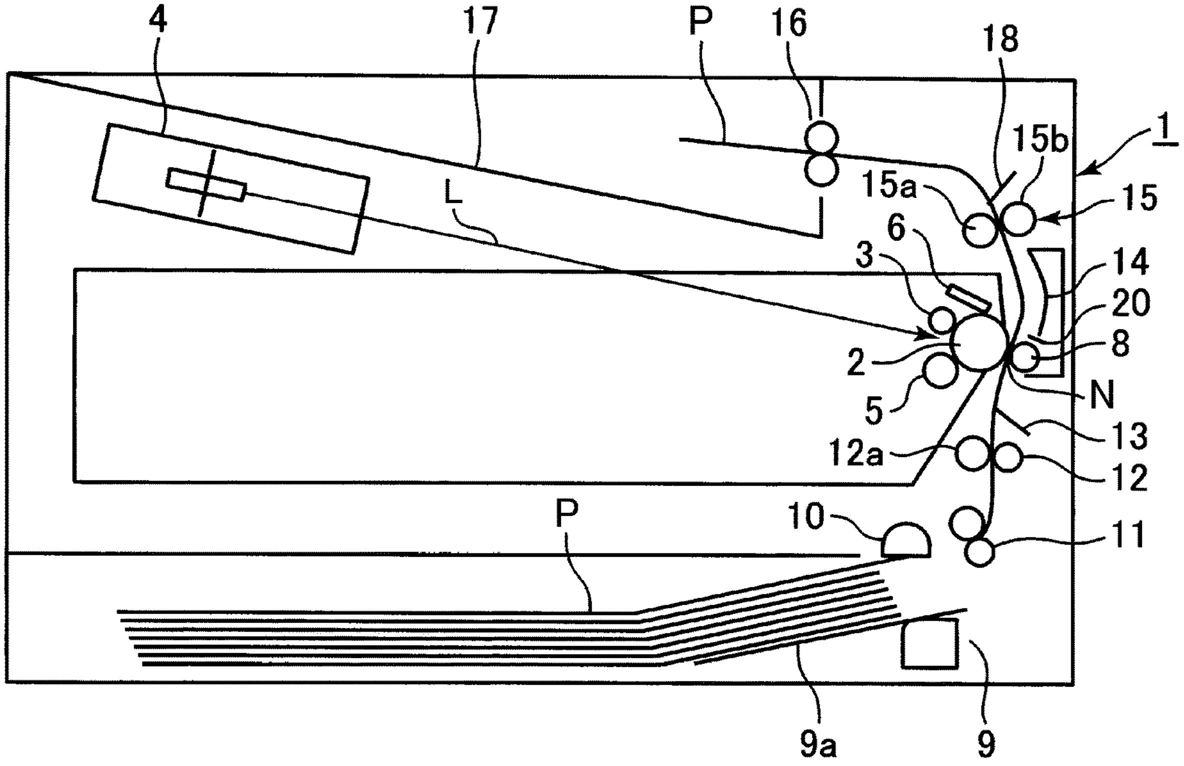
FIG. 1 is a schematic sectional view of an image forming apparatus.

FIG. 1 is a schematic sectional view of the image forming apparatus 1 of this embodiment. The image forming apparatus 1 of this embodiment is a laser beam printer of an electrophotographic type and forms an image on a recording material P, such as paper or a plastic film, depending on image information inputted from an external device 200 (FIG. 3) such as a host computer.

The image forming apparatus 1 includes a rotatable drum-shaped (cylindrical) photosensitive member (photosensitive drum) 2 as an image bearing member. When a print instruction (print operation start instruction) is inputted from the external device 200 to the image forming apparatus 1, the photosensitive member 2 is rotationally driven at a predetermined peripheral speed (process speed) in a counterclockwise direction in FIG. 1.

In this embodiment, the photosensitive member 2 is constituted by forming an OPC (organic photoconductor: organic photosensitive member) layer on an aluminum cylinder. In this embodiment, the OPC layer includes a 20 μm-thick CT layer (charge transfer layer: charge transport layer) principally formed with a polycarbonate-based binder. Further, in this embodiment, an outer diameter of the photosensitive member 2 is 30 mm.

A surface of the rotating photosensitive member 2 is electrically charged uniformly to a predetermined polarity (negative polarity in this embodiment) and a predetermined potential by a charging roller 3 which is rotatable roller-shaped charging member as a charging means. In this embodiment, the photosensitive member 2 is charged so that a surface potential (charge potential dark-portion potential) is −500 V. In this embodiment, the charging roller 3 is an elastic (member) roller with a single layer constitution in which an electroconductive elastic layer is coated around an electroconductive core metal. In this embodiment, the charging roller 3 is pressed toward the photosensitive member 2 by a pressing means (not shown) at each of opposite end portions of the electroconductive core metal with respect to a longitudinal direction, and is rotated with the rotation of the photosensitive member 2 in contact with the surface of the photosensitive member 2. In this embodiment, during the charging stop, to the charging roller 3, a predetermined charging voltage (charging bias) which is a DC voltage of the negative polarity is applied. Incidentally, with respect to a rotational direction of the photosensitive member 2, a position on the photosensitive member 2 where the photosensitive member surface is charged by the charging roller 3 is a charging position. The charging roller 3 charges the surface of the photosensitive member 2 by electric discharge generating in at least one of minute gaps, between the photosensitive member 2 and the charging roller 3, formed on sides upstream and downstream of a contact portion between the photosensitive member 2 and the charging roller 3 with respect to the rotational direction of the charging roller 3. However, it would be considered that a position on the photosensitive member 2 where the photosensitive member 2 contacts the charging roller 3 is regarded as the charging position.

The charged surface of the photosensitive member 2 is subjected to scanning exposure to light depending on the image information by an exposure device (laser scanner) 4 as an exposure means. A video controller 110 (FIG. 3) of the image forming apparatus 1 generates a through-series electric digital pixel signal by processing image information inputted from the external device 200 to the image forming apparatus 1. The exposure device 4 outputs laser light L modulated depending on the time-series electric digital pixel signal, and then subjects the charged surface of the photosensitive member 2 to scanning exposure to this laser light L. By this, an electrostatic latent image (electrostatic image) depending on the image information is formed on the photosensitive member 2.

The electrostatic latent image formed on the photosensitive member 2 is developed (visualized) by being supplied with toner as a developer by a developing device 5 as a developing means, so that a toner image (developer image) is formed on the photosensitive member 2. By the developing device 5, toner charged to the same polarity (the negative polarity in this embodiment) as a charge polarity of the photosensitive member 2 is deposited on an exposure portion (image portion) of the photosensitive member 2 where an absolute value of a potential is lowered by exposing the photosensitive member surface to the light after the photosensitive member surface is uniformly charged (reverse development type). In this embodiment, during the developing step, to a developing roller as a developer carrying member (developing member) of the developing device 5, a predetermined developing voltage (developing bias) which is a DC voltage of the negative polarity is applied. In this embodiment, a normal charge polarity of the toner (normal polarity) which is the charge polarity of the toner during the development is the negative polarity. Further, in this embodiment, the developing device 5 uses a non-magnetic one-component developer as the developer, but the developer may be a magnetic one-component developer or a two-component developer containing toner and a carrier. Incidentally, with respect to the rotational direction of the photosensitive member 2, a position on the photosensitive member 2 where the electrostatic latent image is developed by the developing device 5 (a position on the photosensitive member 2 where the photosensitive member 2 and the developing roller are in contact with each other in this embodiment) is a developing position.

A transfer roller 8 which is a rotatable roller-shaped transfer member (rotatable transfer member) as a transfer means is provided opposed to the photosensitive member 2. In this embodiment, the transfer roller 8 is an elastic roller which is 14 mm in outer diameter and which is prepared by forming a sponge-like elastic layer formed in a thickness of 4.5 mm with NBR (acrylonitrile-butadiene rubber) or hydrin rubber on a core metal formed in an outer diameter of 5 mm with SUS (stainless steel). In this embodiment, the transfer roller 8 is pressed toward the photosensitive member 2 and forms a transfer nip (transfer portion) N which is a contact portion between the surface (outer peripheral surface) and a surface (outer peripheral surface) of the transfer roller 8. The transfer roller 8 is rotated with rotation of the photosensitive member 2. The toner image on the photosensitive member 2 is sent to the transfer nip N by the rotation of the photosensitive member 2. Incidentally, a position on the photosensitive member 2 where the toner image is transferred from the photosensitive member 2 onto the recording material P with respect to the rotational direction of the photosensitive member P (a position on the photosensitive member 2 where the photosensitive member 2 and the transfer roller 8 are in contact with each other in this embodiment) is a transfer position, and a position on the photosensitive member 2 where the above-described transfer nip N is formed corresponds to the transfer position.

Sheet-like recording materials P such as recording sheets or the like stacked on a sheet stacking table 9*a* of a sheet (paper) feeding cassette 9 are picked-up one by one by a sheet feeding roller 10 driven with a predetermined control timing, and the recording material P is sent toward a registration portion by a feeding roller pair 11. In the registration portion, a leading end of the recording material P is once received in a nip between a registration roller 12 and a roller 12*a*, so that the recording material P is subjected to oblique movement correction. Further, in the registration portion, on a side downstream of the registration roller 12 and the roller 12*a* with respect to a feeding direction of the recording material P, a registration sensor 13 as a recording material detecting means is provided. By this registration sensor 13, an arrival timing of each of the leading end and a trailing end of the recording material P is detected. Thereafter, the recording material P is fed from the registration portion toward the transfer nip N. The recording material P fed to the transfer nip N is nipped and fed by the photosensitive member 2 and the transfer roller 8. To the transfer roller 8, in a process in which the recording material P is fed, a predetermined transfer voltage (transfer bias), which is a DC voltage of an opposite polarity (positive polarity in this embodiment) to the normal charge polarity of the toner, is applied, so that the toner image on the photosensitive member 2 is transferred onto the recording material P.

With respect to the feeding direction of the recording material P, on a side downstream of the transfer nip N, a charge removing needle 20 as a charge removing means for the recording material P is provided. This charge removing needle 20 is provided for the purpose of removing excessive electric charges imparted from the transfer roller 8 to the recording material P. The recording material P separated from the surface of the photosensitive member 2 is fed toward a fixing device 15 as a fixing means along a feeding guide 14. The fixing device 15 includes a rotatable fixing member 15*a* such as a fixing film and a pressing member 15*b* such as a pressing roller or the like press-contacting the rotatable fixing member 15*a*. The fixing device 15 heats and presses the recording material P, on which an unfixed toner image is carried, in a fixing nip which is a contact portion between the rotatable fixing member 15*a* and the rotatable pressing member 15*b*, so that the toner image is fixed on the recording material P. The recording material P after the toner image is fixed thereon is discharged from the fixing nip of the fixing developing voltage 15 and is conveyed by a discharging roller 16. On a side downstream of the fixing nip N with respect to the feeding direction of the recording material P, a discharge sensor 18 as a recording material detecting means is provided, and passing or non-passing of the recording material P through the discharge sensor 18 is detected by the discharge sensor 18. The discharging roller 16 discharges (outputs) the recording material P onto a discharge tray 17 provided outside an apparatus main assembly of the image forming apparatus 1.

On the other hand, a deposited matter such as toner (transfer residual toner) remaining on the surface of the photosensitive member 2 after the recording material P is separated from the photosensitive member 2 is removed and collected from the surface of the photosensitive member 2 by a cleaner 6 as a cleaning means. By this, the photosensitive member 2 is subjected to repetitive image formation.

Incidentally, the image forming apparatus 1 of this embodiment is about 300 mm/s in process speed (corresponding to a peripheral speed of the photosensitive member 1) and is 40 sheets/min in print speed (in the case of LTR-size recording material P).

Further, in this embodiment, the photosensitive member 2 and, as the process means actable on the photosensitive member 2, the charging roller 3, the developing device 5, and the cleaner 6 integrally constitute a process cartridge detachably mountable to the apparatus main assembly of the image forming apparatus 1.

Figure 2:
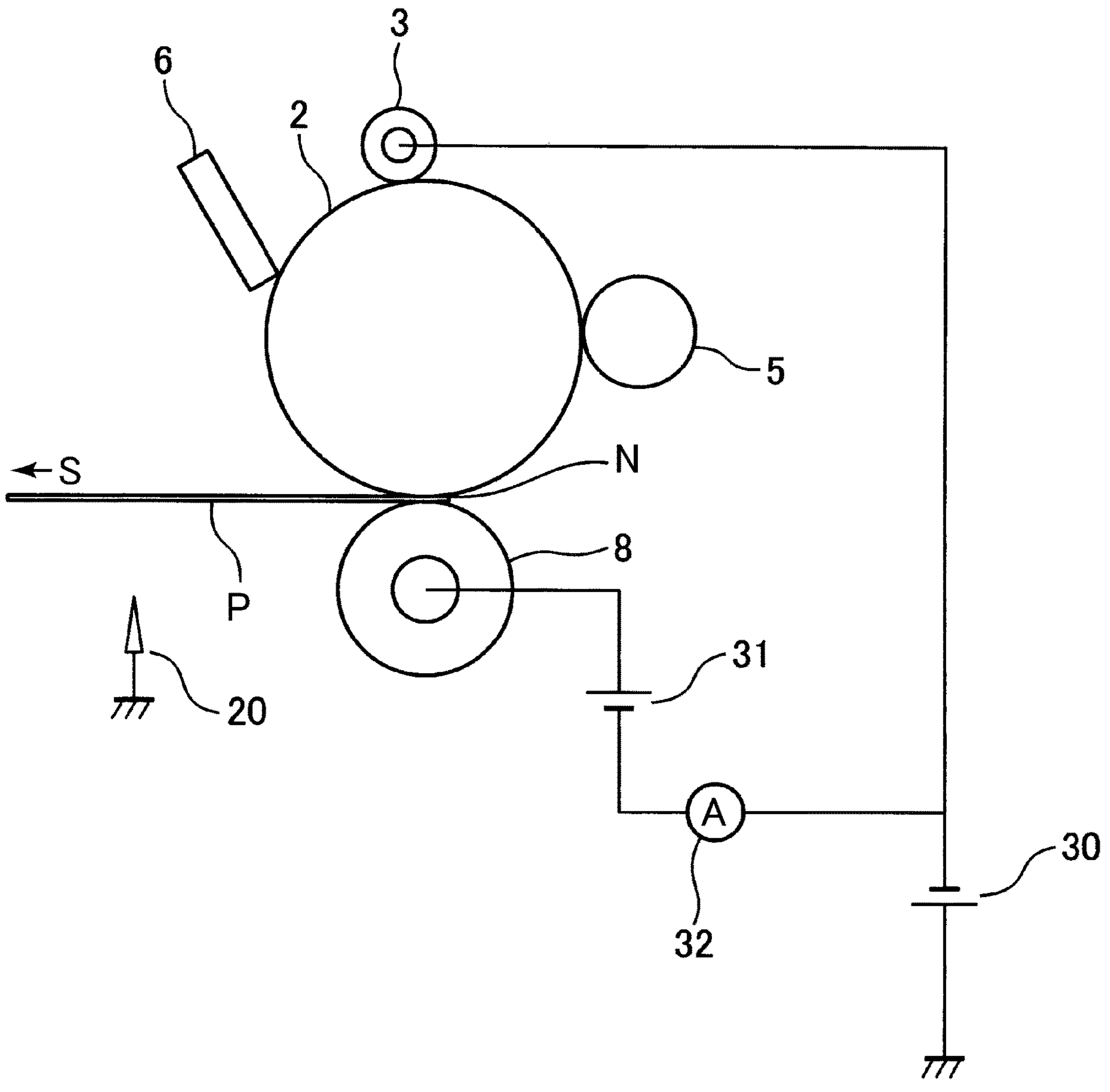
FIG. 2 is a schematic sectional view of a transfer nip and the neighborhood thereof.

With reference to FIG. 2, a constitution relating to application of the voltage to the transfer roller 8 in the image forming apparatus 1 of this embodiment will be described.

FIG. 2 is a schematic view of the transfer nip N and the neighborhood of the image forming apparatus 1 of this embodiment. An arrow S in FIG. 2 represents the feeding direction of the recording material P. The recording material P passes through the transfer nip N and is fed in the arrow S direction.

To the charging roller 3, as a voltage applying means, a first power source 30 for outputting a DC voltage of the negative polarity is connected. The surface of the photosensitive member 2 can be charged to the negative polarity by applying the charging voltage which is the DC voltage of the negative polarity from the first power source 30 to the charging roller 3.

To the transfer roller 8, as voltage applying means, a second power source 31 for outputting a DC voltage of a positive polarity and the above-described first power source 30 for outputting the voltage of the negative polarity are connected in series. The first power source 30 has both functions as the power source for applying the voltage of the negative polarity to the charging roller 3 and the power source for applying the voltage of the negative polarity to the transfer roller 8. In this embodiment, by such a constitution, downsizing and cost reduction of the image forming apparatus 1 are realized. Further, to the second power source 31, a current detecting portion (current detecting circuit, ammeter) 32 as a current detecting means for detecting a current flowing through the transfer roller 8 (transfer nip N) in order to perform constant-current control of the voltage applied to the transfer roller 8 (as described later) is connected. The current detecting portion 32 detects the current flowing through the transfer roller 8 and inputs a signal indicating a detection result of a current value to a controller 100 (described later). Further, in this embodiment, the controller 100 functions as a voltage detecting means and is capable of detecting (recognizing voltage values) of the voltages outputted by the first power source 30 and the second power source 31. Incidentally, the first power source 30, the second power source 31, or the like is provided with a voltage detecting portion (voltage detecting circuit, voltage meter) as a voltage detecting means, and the voltage detecting portion may input a signal indicating a detection result of a voltage value to the controller 100.

The first power source 30 continuously output outputs a certain voltage in order to apply the voltage of the negative polarity to the charging roller 3 during the print operation (corresponding to a period from a start to a stop of rotation of the photosensitive member 2). The negative voltage outputted by the first power source 30 and the positive voltage outputted by the second power source 31 are applied to the transfer roller 8 in a superimposition manner. By controlling the positive voltage outputted by the second power source 31, a desired voltage selected from the positive DC voltage to the negative DC voltage (inclusive of 0 V as the applied voltage) can be applied to the transfer roller 8 as described later. Further, the superimposed voltage of the positive voltage and the negative voltage is applied to the transfer roller 8, so that when the voltage applied to the transfer roller 8 is switched in paper tailing end control (or paper trailing end control) (described later), a speed (response speed) for attenuating the transfer voltage during transfer to a trailing end voltage can be made fast. On an attenuation time of the voltage applied to the transfer roller 8, a time for elimination of electric charges from a capacitor (not shown) or the like in order to stabilize output of the second power source 31 has a large influence. In this embodiment, at a timing when the voltage applied to the transfer roller 8 is changed to the trailing end voltage, the negative voltage has already been outputted from the first power source 30. For that reason, compared with application of only the positive voltage, movement of the charges from the capacitor or the like is promoted, with the result that the attenuation time of the voltage applied to the transfer roller 8 can be shortened. In this embodiment, the first and second power sources 30 and 31 constitute an applying portion for applying the voltage to the transfer member 8.

Incidentally, the image forming apparatus 1 is also capable of employing constitution in which the power source for applying the negative voltage to the charging roller 3 and the power source for applying the positive voltage and the negative voltage to the transfer roller 8 are separately provided.

2. Control Mode

Figure 3:
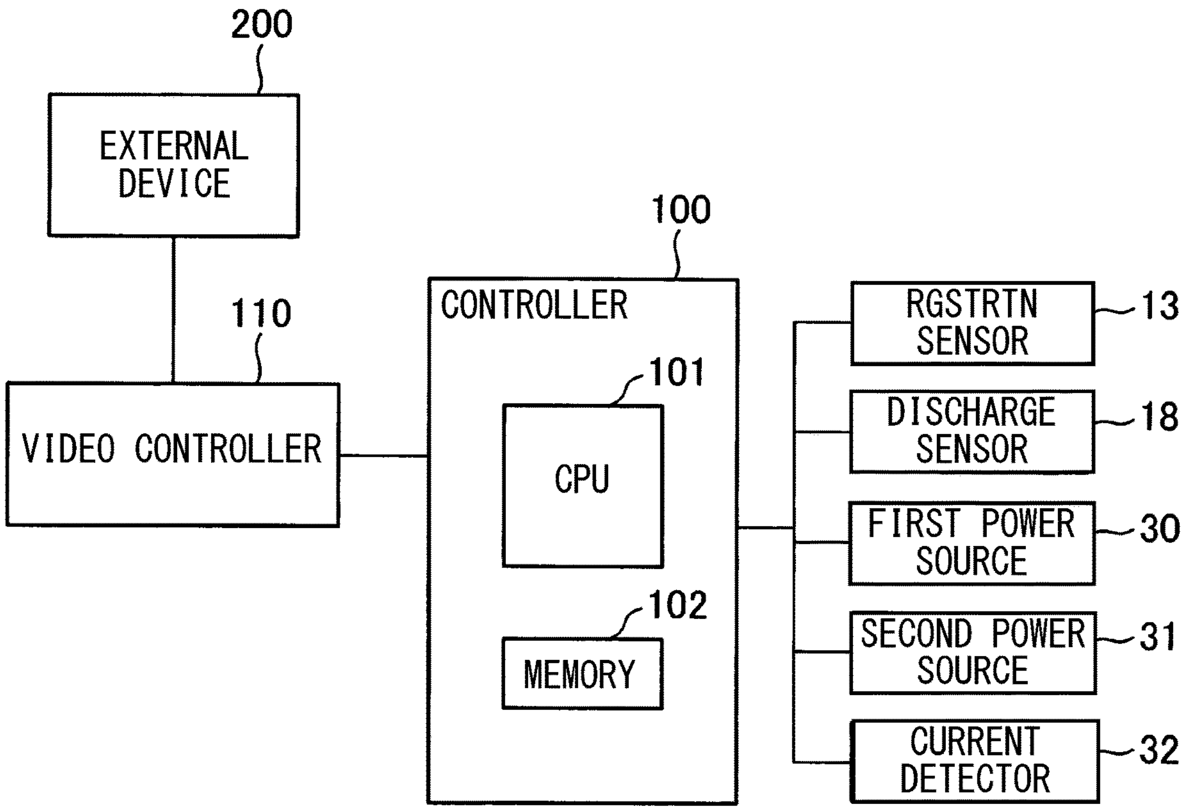
FIG. 3 is a block diagram showing an operation mode of a principal part of the image forming apparatus.

FIG. 3 is a schematic block diagram showing a control made of a principal part of the image forming apparatus 1 of this embodiment. The image forming apparatus 1 is provided with a controller 100 for controlling an operation of the image forming apparatus 1. The controller 100 is constituted by including a CPU 101 as a calculation (computation) control means which is a central element for performing arithmetic processing, a memory (storing medium) 102 such as a ROM or a RAM as a storing means, an input/output portion (not shown) for controlling transfer of signals between the controller 100 and the respective portions, and the like. In the RAM, which is a rewritable memory, information inputted to the controller 100, detected information, a calculation result, and the like are stored, and in the ROM, control programs, data tables acquired in advance, and the like are stored. The CPU 101 and the memory 102 such as the RAM or the ROM are capable of data transfer and reading therebetween.

The controller 100 carries out integrated control of the respective portions of the image forming apparatus 1. In this embodiment, to the controller 100, particularly, the registration sensor 13, the discharge sensor 18, the first power source 30, the second power source 31, the current detecting portion 32, and the like are connected. As described later, the controller 100 controls the first power source 30 and the second power source 31 (particularly, the second power source 31) on the basis of a detection result of a feeding state of the recording material P by the registration sensor 13 or the discharge sensor 18, and thus switches the voltage applied to the transfer roller 8. Further, as described later, on the basis of a detection result of the current flowing through the transfer roller 8 (transfer nip N) by the current detecting portion 32, the controller 100 controls the transfer voltage applied to the transfer roller 8 during transfer.

Here, the image forming apparatus 1 executes a print operation (print job, image forming operation), which is a series of operations for forming and outputting the image (images) on a single or a plurality of recording materials P and which is started by a single starting instruction. The print operation includes, in general, an image forming step, a pre-rotation step, a sheet interval step in the case where the images are formed on the plurality of recording materials P, and a post-rotation step. The image forming step is a period in which formation of the electrostatic latent image for the image formed and outputted on the recording material P, formation of the toner image, [and] transfer of the toner image, and the like are carried out in actuality, and during image formation refers to this period. Specifically, a timing during image formation is different at each of the positions where the respective steps of the formation of the electrostatic latent image, the formation of the toner image, the transfer of the toner image, and the like are carried out, and corresponds to a period in which an image forming region on the photosensitive member 2 passes through an associated one of the above-described respective positions. The pre-rotation step is period from the input of the start instruction until the image is started to be formed in actuality, in which a preparation operation before the image forming step is performed. The sheet interval step (image interval step, recording material interval step) is a period corresponding to an interval between two recording materials P when the images are continuously formed on the plurality of recording materials P (continuous image formation). The post-rotation step is period in which a post operation (preparatory operation) after the image forming step is performed. During non-image formation is a period other than during the image formation and includes the periods of the pre-rotation step, the sheet interval step, the post-rotation step, and in addition, during turning-on of a power source of the image forming apparatus 1, a pre-multi-rotation step which is a preparatory operation step during restoration from a sleep state, or the like. Specifically, a timing during the non-image formation corresponds to a period in which a non-image forming region on the photosensitive member 2 passes through the associated one of the respective positions where the steps of forming the electrostatic latent image, forming the toner image, and transferring the toner image are performed. Incidentally, the image forming region on the photosensitive member 2 or the recording material P refers to a region which is defined in advance depending on a size of the recording material P and on which the toner image transferred onto the recording material P and then outputted from the image forming apparatus 1 is capable of being outputted, and the non-image forming region refers to a region other than the image forming region. Incidentally, in this embodiment, a margin portion, which is the non-image forming region, is provided in a predetermined region at a leading end portion and a trailing end portion (particularly, the trailing end portion) of the recording material P with respect to the feeding direction of the recording material P.

3. Occurrence Mechanism of Paper End Contamination

An occurrence mechanism of the paper end contamination will be described. In the image forming apparatus 1, when a jam (pass jam) occurs after the print operation is started, the image forming apparatus 1 is at rest in an in completed incompleted (uncompleted) state of the print operation. Then, when the jam thus occurs and the image forming apparatus 1 is at rest in the incompleted state of the print operation, contamination toner, which is negative toner, is deposited on the transfer roller 8 in some cases. Incidentally, on the basis of a detection signal of the registration sensor 13 or the discharge sensor 18, the controller 110 discriminates that the jam occurred in the case where the leading end or the trailing end of the recording material P is not detected by these sensors at a timing in a predetermined range, and is capable of stopping an operation of the image forming apparatus 1. Here, the stop of the operation of the image forming apparatus 1 in the incompleted state of the print operation specifically refers to the following. That is, after a start instruction is inputted to the image forming apparatus 1 and thus the print operation is started and before output of all the images designated by the print operation is ended and thus the operation of the image forming apparatus 1 is normally stopped, the operation (rotation of the photosensitive member 2, feeding of the recording material P) of the image forming apparatus 1 is forcedly stopped. Typically, such stop of the image forming apparatus 1 refers to stop of the rotation of the photosensitive member 2 and the feeding of the recording material P in a state in which at least a part of the toner image is present on the photosensitive member 2 or in a state in which at least a part of the toner image remains unfixed on the recording material P after the print operation is started and thus the rotation of the photosensitive member 2 is started.

In the print operation after the jam occurrence, when the positive transfer voltage is applied to the transfer roller 8 during transfer, the negative toner deposited on the transfer roller 8 is attracted to and held by the transfer roller 8, and therefore, is not readily transferred onto a back surface (non-image forming surface) of the recording material P. However, in the case where the voltage applied to the transfer roller 8 is of the positive polarity and is smaller in absolute value than that during transfer, the case where the voltage is about 0 V, or the case where the voltage is of the negative polarity, the following phenomenon occurs. That is, a retaining force of the negative toner, deposited on the transfer roller 8, by the transfer roller 8 becomes weak or a force acts from the transfer roller 8 in a repelling direction. For that reason, in the case where in order to realize the lifetime extension of the photosensitive member 2 by suppressing the abrasion of the surface of the photosensitive member 2 in the trailing end portion of the recording material P, control in which the voltage applied to the transfer roller 8 is made lower than the transfer voltage applied to the transfer roller 8 during transfer is carried out, the following phenomenon occurs in some instances. That is, the toner is liable to transfer from the transfer roller 8 onto an edge (end surface) of the trailing end of the recording material P, so that the paper end contamination of the trailing end of the recording material P occurs in some instances. Particularly, when the recording materials contaminated at the edge are layered, the contaminant is easily recognized visually.

4. Control of Voltage Applied to Transfer Roller

Next, control of the voltage applied to the transfer roller 8 in this embodiment will be described. In this embodiment, in the image forming apparatus 1, as a setting of the voltage applied to the transfer roller 8 in the print operation, a first setting and a second setting are provided. The first setting is a setting for realizing the lifetime extension of the photosensitive member 2 by suppressing the surface abrasion of the photosensitive member 2 (hereinafter, also referred to as a “normal setting”). Further, the second setting is a setting for suppressing the paper end contamination after the jam occurrence (hereinafter, also referred to as a “contamination suppression setting”). Here, the setting of the voltage applied to the transfer roller 8 is specifically a setting of a target value (target voltage) of the voltage in the case where the voltage is applied to the transfer roller 8 through constant-voltage control or a setting of a target value (target current) of the current in the case where the voltage is applied to the transfer roller 8 through constant-current control.

Part (a) of FIG. 4 shows an example of the case where continuous image formation is carried out while providing a sheet (paper) interval of preceding paper P1 and subsequent paper P2 subsequent to the preceding paper 1, which are recording materials P.

When the print operation is started, the controller 100 executes cleaning control for cleaning the transfer roller 8 in a pre-rotation stop step. The controller 100 carries out control so that contamination toner which can be deposited on the transfer roller 8 is transferred onto the photosensitive member 2 by applying the negative voltage opposite to the polarity of the transfer voltage during transfer of the toner image onto the transfer roller 8 through the constant-voltage control, and thereafter, the toner is collected by the cleaner 6. In this embodiment, a voltage value of the voltage for cleaning the transfer roller 8 in the cleaning control was set at −500 V.

Next, the controller 100 executes ATVC (auto transfer voltage control). The ATVC is control for determining an initial voltage value of the transfer voltage (described later). The ATVC is executed before the recording material P is fed to the transfer nip N. The controller 100 controls the second power source 31 so that the current detected by the current detecting portion 32 approaches the target current. In this embodiment, in the ATVC, the voltage of the positive polarity opposite to the normal charge polarity is applied to the transfer roller 8. Then, the controller 100 acquires a voltage value of the voltage (voltage outputted by the second power source 31) applied to the transfer roller 8 at that time, and then determines an initial voltage value on the basis of the acquired voltage value. In this embodiment, the target current of the ATVC was set at 3 μA.

Next, the controller 100 controls the second power source 31 immediately before the recording material P is fed to the transfer nip N so that the transfer voltage with the initial voltage value determined by the ATVC is applied through the constant voltage control. That is, in this embodiment, when a predetermined region of a leading end portion of the recording material P including a leading end of the recording material P passes through the transfer nip N, the transfer voltage with the initial voltage value determined by the ATVC is applied to the transfer roller 8 through the constant-voltage control. In this embodiment, the predetermined region of the leading end portion of the recording material P corresponds to the margin portion of the leading end portion of the recording material P. However, the predetermined region of the leading end portion of the recording material P includes at least a part of the image forming region. Thereafter, the controller 100 executes the constant-current control of the transfer voltage (the DC voltage of the positive polarity opposite to the normal charge polarity of the toner and the charge polarity of the photosensitive member 2) applied to the transfer roller 8. The constant-current control is control executed for transferring the toner (image) onto the recording material P. The controller 100 controls the power source 31 so that the current detected by the current detecting portion 32 approaches the target current in the constant-current control of the transfer voltage, and thus adjusts the transfer voltage applied to the transfer roller 8. That is, in this embodiment, when a predetermined region between a predetermined region of the leading end portion of the recording material P and a predetermined region of the trailing end of the recording material P (described later) passes through the transfer nip N ("during transfer"), the transfer voltage is applied to the transfer roller 8. The predetermined region between the predetermined region of the leading end portion of the recording material P and the predetermined region of the trailing end of the recording material P corresponds to a region including the entirety of the image forming region. However, this predetermined region does not have to include a part of the image forming region in the case where the predetermined region of the leading end portion of the recording material P or the predetermined region of the trailing end portion includes at least the part of the image forming region. In this embodiment, the target current of the constant-current control of the transfer voltage was set at 10 μA. Further, in this embodiment, in an environment of 23° C. in temperature and 60% RH in relative humidity, the initial voltage value of the transfer voltage is about 1000 V.

In the case where there is a subsequent paper P2 subsequent to a preceding paper P1 after the constant-current control of the transfer voltage, the controller 100 executes the paper tailing end control in a state in which the image forming region is not present in the transfer nip N on and after the time when a trailing end portion of the preceding paper P1 passes through the transfer nip N. The paper tailing end control is started after the image forming region of the preceding paper P1 passes through the transfer nip N. In the trailing end control, the controller 100 controls a predetermined trailing end voltage (described later) so as to be applied to the transfer roller 8 through the constant-voltage control. Thus, in the paper tailing end control, the trailing end voltage is applied to the transfer roller 8 through the constant-voltage control in the state in which the image forming region is not present in the transfer nip N on and after the time when the trailing end portion of the recording material P passes through the transfer nip N. The state in which the image forming region is not present in the transfer nip N on and after the time when the trailing end portion of the recording material P passes through the transfer nip N corresponds to a period in which a margin portion of the trailing end portion of the recording material P and a sheet (paper) interval region pass through the transfer nip N. Incidentally, for example, in the case where an attenuation time of the voltage applied to the transfer roller 8 is slower in the like case, a start timing of the trailing end control may be made early so that the paper tailing end control is started in a range in which the toner in the image forming region is capable of being transferred. That is, in this embodiment, when the predetermined region of the trailing end portion of the recording material P including the trailing end of the recording material P passes through the transfer nip N, the trailing end voltage is applied to the transfer roller 8 through the constant-voltage control. In this embodiment, the predetermined region of the trailing end portion of the recording material P corresponds to the margin portion of the trailing end portion of the recording material P. However, the predetermined region of the trailing end portion of the recording material P may include at least a part of the image forming region.

The paper tailing end control in the normal setting is executed for realizing the lifetime extension of the recording material P by suppressing the abrasion of the surface of the photosensitive member 2 through a decrease in potential difference between the surface (charge potential) of the photosensitive member 2 and the transfer roller 8. In the paper tailing end control in the normal setting, the trailing end voltage is the DC voltage of the negative polarity (which is opposite to the polarity of the transfer voltage during transfer and which is the same as the normal charge polarity of the toner and the charge polarity of the photosensitive member 2). In this embodiment, the trailing end voltage in the normal setting was set at −500 V, which is the same as −500 V as the surface potential (charge potential, dark-portion potential) of the photosensitive member 2. The trailing end voltage in the normal setting may only be required to be set so that the potential difference between the surface (charge potential) of the photosensitive member 2 and the transfer roller 8 during the paper tailing end control in the normal setting is made smaller than the potential difference between the surface (charge potential) of the photosensitive member 2 and the transfer roller 8 during the transfer. That is, the trailing end voltage in the normal setting may only be required to be made lower (smaller) than the transfer voltage applied to the transfer roller 8 during the transfer. However, the trailing end voltage in the normal setting may preferably be set so that the potential difference between the surface (charge potential) of the photosensitive member 2 and the transfer roller 8 is less than an electric discharge start voltage. Further, it is preferable that the trailing end voltage in the normal setting is of the negative polarity, which is the same polarity as the charge polarity of the photosensitive member 2, and is minimized in potential difference between the surface (charge polarity) of the photosensitive member 2 and the transfer roller 8. From this viewpoint, the trailing end voltage in the normal setting may more preferably be substantially the same as the surface potential (charge potential, dark-portion potential) of the photosensitive member 2 (i.e., the potential difference is about 0 V).

After the execution of the paper tailing end control, the controller 100 executes the ATVC before the subsequent paper P2 reaches the transfer nip N. Thereafter, similarly as in the case of the preceding paper P1, as regards the subsequent paper P2, the constant-current control of the transfer voltage and the paper tailing end control are repeated, so that continuous image formation is carried out.

Incidentally, in the case where there is no subsequent paper after the constant-current control of the transfer voltage, i.e., in the case where the recording material P for which the constant-current control of the transfer voltage is carried out, the paper tailing end control is carried out, and then the print operation is ended.

With reference to part (b) of FIG. 4, the control of the voltage applied to the transfer roller 8 during the print operation in the contamination suppression setting will be described. Part (a) of FIG. 4 is a time chart showing a time-series change in voltage applied to the transfer roller 8 during the print operation in the contamination suppression setting. The contamination suppression setting is applied in the print operation after occurrence of the jam. The cleaning control, the ATVC, and the constant-current control of the transfer voltage during the print operation in the contamination suppression control are the same as those in the normal setting, and therefore, will be omitted from description. During the print operation in the contamination suppression control shown in part (b) of FIG. 4, a setting of the trailing end voltage applied to the transfer roller 8 in the paper tailing end control is different from that during the print operation in the normal setting shown in part (a) of FIG. 4.

In the case where there is a subsequent paper P2 subsequent to a preceding paper P1 after the constant-current control of the transfer voltage, the controller 100 executes the paper tailing end control in a state in which the image forming region is not present in the transfer nip N on and after the time when a trailing end portion of the preceding paper P1 passes through the transfer nip N. Similarly as in the case of the normal setting, the paper tailing end control is started after the image forming region of the preceding paper P1 passes through the transfer nip N. In the trailing end control, the controller 100 controls a predetermined trailing end voltage (described later) so as to be applied to the transfer roller 8 through the constant-voltage control. Incidentally, similarly as in the case of the normal setting, for example, in the case where an attenuation time of the voltage applied to the transfer roller 8 is slower in the like case, a start timing of the trailing end control may be made early so that the paper tailing end control is started in a range in which the toner in the image forming region is capable of being transferred.

The paper tailing end control in the contamination suppression setting is executed for suppressing the occurrence of the paper end contamination. In the paper tailing end control in the contamination suppression setting, the trailing end voltage is the DC voltage of the positive polarity (which is the same as the polarity of the transfer voltage during transfer and which is opposite to the normal charge polarity of the toner and the charge polarity of the photosensitive member 2). In the case where the jam such that the transfer roller 8 is contaminated with the toner occurred, in a subsequent print operation, a sufficient trailing end voltage of the positive polarity is applied to the transfer roller 8 when the trailing end of the recording material P passes through the transfer nip N. By this, the toner of the negative potential is held by the transfer roller 8 and thus is prevented from being deposited on the recording material P, so that the paper end contamination can be suppressed. In this embodiment, the trailing end voltage in the contamination suppression setting was set at +500 V. That is, a voltage value of the trailing end voltage in the contamination suppression setting is set at a voltage value larger than a voltage value of the trailing end voltage in the normal setting in a direction of the positive polarity opposite to the normal charge polarity of the toner. Here, in this embodiment, the trailing end voltage in the contamination suppression setting is set so that the potential difference between the surface (charge potential) of the photosensitive member 2 and the transfer roller 8 during the paper tailing end control in the normal setting is made smaller than the potential difference between the surface (charge potential) of the photosensitive member 2 and the transfer roller 8 during the transfer. That is, in this embodiment, the trailing end voltage in the contamination suppression setting is made lower (smaller) than the transfer voltage applied to the transfer roller 8 during the transfer. However, the trailing end voltage in the contamination suppression control may be substantially the same as the transfer voltage during the transfer.

Incidentally, the control of the voltage applied to the transfer roller 8 is executed in view of a detection result of the leading end and the trailing end of the recording material P by the registration sensor 13 and a feeding distance of the recording material P between the registration sensor 13 and the transfer nip N. By this, in synchronism with a timing when the recording material P (specifically, the image forming region on the recording material P) passes through the transfer nip N, the voltage applied to the transfer roller 8 can be changed.

5. Count Value

In order to realize the life time extension of the photosensitive member 2 by suppressing the abrasion of the surface of the photosensitive member 2, after the print operation in the contamination suppression setting is performed so that the paper end contamination can be sufficiently suppressed after the occurrence of the jam, there is a need to return the setting of the voltage applied to the transfer roller 8 from the contamination suppression setting to the normal setting.

Therefore, in this embodiment, a count value is set, and on the basis of the count value, either one of the normal setting and the contamination suppression setting is applied as the setting of the voltage applied to the transfer roller 8. In this embodiment, the count value is a value indicating the number of sheets (the number of sheets subjected to the image formation (print number)) of the recording materials on which the images are formed until the setting of the voltage applied to the transfer roller 8 is returned from the contamination suppression setting to the normal setting. In this embodiment, the controller 100 causes the memory (RAM) 102 to be capable of successively updating and storing the count value as described later. Incidentally, the count value may be a value indicating the number of sheets of the recording materials P converted on a predetermined-size basis. Further, as the count value, instead of the number of sheets of the recording material P, it is possible to appropriately use an index value correlating with the feeding distance of the recording material P in the transfer nip N after the occurrence of the jam, such as the number of rotations (rotation time) of the transfer roller 8 or the photosensitive member 2.

The contamination toner deposited on the transfer roller 8 is deposited on the back surface of the recording material P to the extent such that the contamination toner cannot be recognized through eye observation, and therefore, an amount of the contamination toner is gradually decreased with passing of the recording material P through the transfer nip N. Therefore, in this embodiment, when the jam occurs, a predetermined value is set as the count value, and the count value is decreased by 1 every time when a single recording material P (sheet) passes through the transfer nip N (i.e., every time when the image is formed on the single sheet). Then, when the count value becomes 0, the setting of the voltage applied to the transfer roller 8 is returned from the contamination suppression setting to the normal setting. In this embodiment, the count value was set at 120. Incidentally, in this embodiment, a countdown type in which the count value is decremented was employed, but the count value is incremented after the occurrence of the jam, and when the count value reaches a predetermined threshold, the setting of the voltage applied to the transfer roller 8 may be returned from the contamination suppression setting to the normal setting.

FIG. 5 is a flowchart for illustrating processing of selecting the setting of the voltage applied to the transfer roller 8 in the print operation. When the print operation is started, the controller 100 discriminates whether or not the count value is 0 (S101). In the case where the controller 100 discriminated in S101 that the count value is not 0, the controller 100 carries out image formation in the contamination suppression setting (S102). Thereafter, the controller 100 causes the counter to decrease the count value by 1 (S103), and then discriminates whether or not the recording material P on which the image is last formed is last paper (last recording material) (S104). In the case where the controller 100 discriminated in S104 that the recording material P is the last paper, the controller 100 ends the print operation, and in the case where the controller 100 discriminated in S104 that the recording material P is not the last paper, the sequence returns to the processing of S101. On the other hand, in the case where the controller 100 discriminated in S101 that the count value is 0, the controller 100 carries out the image formation in the normal setting (S105), and the sequence goes to processing of S104.

6. Evaluation Test

A result that a paper end contamination evaluation test was conducted in this embodiment (embodiment 1) and a comparison example 1 will be described.

In this evaluation test, a jam was forcedly caused to occur during transfer of said image and then continuous image formation was carried out, and occurrence or non-occurrence of the paper end contamination was checked. As the recording material P, paper ("REDLABEL", 80 g/m$^2$ (trade name), manufactured by Canon K.K.) was used. In the comparison example 1, the setting of the voltage applied to the transfer roller 8 is only the normal setting, and the image formation was carried out in the normal setting even after the occurrence of the jam. In a table 1, the occurrence or non-occurrence of the paper end contamination on the recording materials from a first sheet to a 10th sheet in the continuous image formation in this embodiment (embodiment 1) and the comparison example 1 is shown.

TABLE 1

| | TV*[1] | PEC*[2] |
|---|---|---|
| EMB. 1 | POSITIVE | Not occurred |
| COMP. EX. 1 | NEGATIVE | Occurred |

*[1]"TV" represents the polarity of the transfer voltage in the paper tailing end control.
*[2]"PEC" represents the occurrence or non-occurrence of the paper end contamination.

In this embodiment (embodiment 1), after the occurrence of the jam, as the setting of the voltage applied to the transfer roller 8, the contamination suppression setting was applied, and a positive voltage was applied to the transfer roller 8 when a trailing end of the recording material P passes through the transfer nip N. By this, the paper end contamination did not occur.

In the comparison example, irrespective of the occurrence or non-occurrence of the jam, a negative voltage was always applied to the transfer roller 8 when the trailing end of the recording material P passes through the transfer nip N. For that reason, after the occurrence of the jam, the toner deposited on the transfer roller 8 was transferred onto an edge (end surface) of the trailing end of the recording material P, so that the paper end contamination occurred.

Further, in this embodiment, by setting of the count value, after image formation of 120 sheets in cumulative total after the jam occurred, the setting of the voltage applied to the transfer roller 8 is switched from the contamination suppression setting to the normal setting. In this embodiment, in the case where the jam occurred during the transfer of the solid image and the toner was deposited on the transfer roller 8, thereafter even when the setting was returned from the contamination suppression setting to the normal setting after the image formation of 120 sheets, it was confirmed that the paper end contamination does not occur. Thus, a period in which the polarity of the trailing end voltage in the paper tailing end control is made positive is kept minimum, so that the paper end contamination can be suppressed while suppressing the influence on the life time of the photosensitive member 2 to a minimum level.

Thus, in this embodiment, the image forming apparatus 1 includes the rotatable photosensitive member 2, the charging means 3 for charging the surface of the photosensitive member 2, the developing means 5 for forming the toner image by supplying the toner to the surface of the photosensitive member 2, the transfer member 8 forming the transfer portion N in contact with the surface of the photosensitive member 2 and for transferring the toner image from the surface of the rotating photosensitive member 2 onto the recording material P passing through the transfer portion N, the applying portions 30 and 31 for applying the voltages to the transfer member 8, and the controller 100 capable of executing the control of changing the trailing end voltage to the transfer member 8 by the applying portions 30 and 31 when the trailing end of the recording material P with respect to the feeding direction of the recording material P passes through the transfer portion N. Further, in this embodiment, the controller 100 is capable of changing the trailing end voltage to a first trailing end voltage (trailing end voltage in the normal setting) smaller than the transfer voltage applied to the transfer member 8 by the applying portions 30 and 31 when the toner image is transferred from the photosensitive member 2 onto the recording material P and to a second trailing end voltage (trailing end voltage in the contamination suppression setting) larger than the first trailing end voltage in the direction of the polarity opposite to the normal charge polarity of the toner, and controls the trailing end voltage so that the second trailing end voltage is applied when the trailing end of the photosensitive member P with respect to the recording material feeding direction passes through the transfer portion N in the image forming operation after the rotation of the photosensitive member 2 is stopped in the state in which the image forming apparatus is not yet completed (i.e., after the jam occurred). In this embodiment, in the case where the rotation of the photosensitive member 2 is stopped in the incompleted state of the image forming operation, the controller 100 changes the trailing end voltage to the first trailing end voltage after the second trailing end voltage is applied when the trailing end with respect to the above-described feeding direction of each of recording materials P in a predetermined number passes through the transfer portion N. Further, in this embodiment, the first trailing end voltage has the same polarity as the normal charge polarity of the toner. Further, in this embodiment, an absolute value of the second trailing end voltage is smaller than an absolute value of the transfer voltage. Here, typically, the case where the rotation of the photosensitive member 2 is stopped in the incompleted state of the image forming operation includes the case where the rotation of the photosensitive member 2 is stopped in at least one of a state in which the toner image is present on the photosensitive member 2 and a state in which the toner image transferred from the photosensitive member 2 on the recording material P remains unfixed on the recording material P.

As described above, according to this embodiment, the contamination suppression setting is applied as the setting of the voltage applied to the transfer roller 8 after the occurrence of the jam, and after the image formation of the predetermined number of sheets, the setting of the voltage applied to the transfer roller 8 is returned to the normal setting. By this, it becomes possible to suppress the paper end contamination while realizing the life time extension of the photosensitive member 2 through suppression of the surface abrasion of the photosensitive member 2. According to this embodiment, even when the cleaning of the transfer roller 8 after the jam occurrence is insufficient by changing the setting of the trailing end voltage applied to the transfer roller 8 in the print operation after the jam occurrence, the paper end contamination can be suppressed while realizing the life time extension of the recording material P. That is, according to this embodiment, in the constitution in which the trailing end voltage applied to the transfer member 8 when the trailing end of the recording material P passes through the transfer portion N is controlled, it is possible to suppress the paper end contamination of the trailing end of the recording material P.

Next, another embodiment (embodiment 2) of the present invention will be described. Basic constitution and operation of an image forming apparatus of this embodiment are the same as those of the image forming apparatus of the embodiment 1. Accordingly, in the image forming apparatus of this embodiment, elements having the same or corresponding functions or constitutions to those of the image forming apparatus of the embodiment 1 will be omitted from detailed description by adding the same reference numeral or symbols as those in the embodiment 1.

1. Constitution of Image Forming Apparatus of this Embodiment

The process speed (corresponding to the peripheral speed of the photosensitive member 2) is about 300 mm/s similarly as in the image forming apparatus 1 of the embodiment 1. On the other hand, the print speed (in the case where the normal setting described later is applied) of the image forming apparatus 1 of this embodiment is 55 sheets/min (in the case of the LTR-size recording material P), and is faster than the print speed of the image forming apparatus 1 of the embodiment 1. In the embodiment 1, a length of the sheet interval is 171 mm, and on the other hand, in this embodiment, the length of the sheet interval is shortened to 48 mm (in the case where the normal setting is applied), so that improvement in productivity of the image forming apparatus 1 was realized. By this, in the embodiment 1, the sheet interval length is longer than a peripheral length (corresponding to one-full circumference) of 94 mm, and on the other hand, in this embodiment, the sheet interval length (in the case where the normal setting is applied) is shorter than the peripheral length of 94 mm. Thus, in the case where the sheet interval length is made short a trailing end memory is liable to occur.

2. Occurrence Mechanism of Trailing End Memory and Countermeasure to Trailing End Memory With reference to parts (a) and (b) of FIG. 6, an occurrence mechanism of a trailing end memory will be described. Part (a) of FIG. 6 is a schematic view showing a state in which the recording material P is passing through the transfer nip N. An arrow S in part (a) of FIG. 6 shows the feeding direction of the recording material P. To the transfer roller 8, the positive transfer voltage is applied. The surface of the photosensitive member 2 is charged to the negative polarity, and the back surface of the recording material P is charged to the positive polarity in the transfer nip N. For that reason, a potential difference is generated between the surface of the photosensitive member 2 and the back surface of the recording material P. It has been known that by this potential difference, a certain electric charges is accumulated in the recording material P, which thus performs the function such as a capacitor.

Part (b) of FIG. 6 is a schematic view showing a state after the trailing end of the recording material P passes through the transfer nip N. When the recording material P is separated from the photosensitive member 2 in a state in which a certain charge amount is accumulated in the recording material P, an apparent electrostatic capacity abruptly decreases, so that the potential difference between the recording material P and the photosensitive member 2 abruptly increases. When this potential difference exceeds a predetermined threshold, peeling discharge generates, and thus positive electric charges abruptly move to the photosensitive member 2, so that potential non-uniformity such that the potential of the photosensitive member 2 locally lowers is caused to occur. When this peeling discharge is conspicuous, the charge non-uniformity cannot be completely canceled by single charging when the image is formed on a is subsequent recording material P and appears as a lateral black stripe (high-density portion extending along a rotational axis direction of the photosensitive member 2). This image defect is called a "trailing end memory". Thus, the trailing end memory occurs due to the peeling discharge.

Therefore, in this embodiment, similarly as in the embodiment 1, in the normal setting of the voltage applied to the transfer roller 8, the voltage applied to the transfer roller 8 in the paper tailing end control is made lower (smaller) than the transfer voltage applied to the transfer roller 8 during the transfer. By this, similarly as in the embodiment 1, not only the life time extension of the photosensitive member 2 is realized by suppressing the surface abrasion of the photosensitive member 2, but also the occurrence of the trailing end memory can be suppressed.

3. Control of Voltage Applied to Transfer Roller

Next, control of the voltage applied to the transfer roller 8 in this embodiment will be described. In this embodiment, in the image forming apparatus 1, as a setting of the voltage applied to the transfer roller 8 in the print operation, a first setting and a second setting are provided. The first setting is a setting for realizing the lifetime extension of the photosensitive member 2 by suppressing the surface abrasion of the photosensitive member 2 and for suppressing the trailing end memory ("normal setting"). Further, the second setting is a setting for suppressing the paper end contamination after the jam occurrence ("contamination suppression setting").

With reference to part (a) of FIG. 7, the control of the voltage applied to the transfer roller 8 during the print operation in the normal setting will be described. Part (a) of FIG. 7 is a time chart showing a time-series changes in voltage applied to the transfer roller 8 during the print operation in the normal setting. Part (a) of FIG. 7 shows an example of the case where continuous image formation is carried out while providing a sheet (paper) interval of preceding paper P1 and subsequent paper P2 subsequent to the preceding paper 1, which are recording materials P.

The print operation in the normal setting in this embodiment is roughly similar to the print operation in the normal setting in the embodiment 1. During the print operation in the normal setting in this embodiment shown in part (a) of FIG. 7, the sheet interval length between the preceding paper P1 and the subsequent paper P2 (subsequent to the preceding paper P1) is different from the sheet interval length in the normal setting in the embodiment 1 shown in part (a) of FIG. 4. In this embodiment, a sheet interval L1 during the print operation in the normal setting is shorter than a peripheral length L0 of the photosensitive member 2 (L0>L1). Accordingly, in this embodiment, during the print operation in the normal setting, the surface of the photosensitive member 2 contacting the trailing end of the preceding paper P1 is not subjected to the non-image forming region such as the sheet interval after passing through the transfer nip N, but is immediately subjected to the image forming region of the subsequent paper P2. That is, the number of times when the charging roller 3 passes through the charging position until the surface of the photosensitive member 2 contacting the trailing end of the preceding paper P1 is subjected to subsequent image formation is once.

The paper tailing end control in the normal setting is executed not only for realizing the lifetime extension of the recording material P by suppressing the abrasion of the surface of the photosensitive member 2 but also for suppressing the occurrence of the trailing end memory. In the paper tailing end control in the normal setting, the trailing end voltage which is the DC voltage of the negative polarity (which is opposite to the polarity of the transfer voltage during transfer and which is the same as the normal charge polarity of the toner and the charge polarity of the photosensitive member 2). In this embodiment, the trailing end voltage in the normal setting was set at −500 V, which is the same as −500 V as the surface potential (charge potential, dark-portion potential) of the photosensitive member 2.

With reference to part (a) of FIG. 7, the control of the voltage applied to the transfer roller 8 during the print operation in the contamination suppression setting will be described. Part (b) of FIG. 7 is a time chart showing a time-series change in voltage applied to the transfer roller 8 during the print operation in the contamination suppression setting. The print operation in the contamination suppression setting is roughly similar to the print operation in the contamination suppression setting in the embodiment 1. During the print operation in the contamination suppression control shown in part (b) of FIG. 7, a setting of the trailing end voltage applied to the transfer roller 8 in the paper tailing end control and the sheet interval length between the preceding paper P1 and the subsequent paper P2 are different from that during the print operation in the normal setting shown in part (a) of FIG. 7.

The paper tailing end control in the contamination suppression setting is executed for suppressing the occurrence of the paper end contamination. In the paper tailing end control in the contamination suppression setting, the trailing end voltage which is the DC voltage of the positive polarity (which is the same as the polarity of the transfer voltage during transfer and which is opposite to the normal charge polarity of the toner and the charge polarity of the photosensitive member 2). In this embodiment, the trailing end voltage in the contamination suppression setting was set at +500 V. That is, a voltage value of the trailing end voltage in the contamination suppression setting is set at a voltage value larger than a voltage value of the trailing end voltage in the normal setting in a direction of the positive polarity opposite to the normal charge polarity of the toner.

A sheet interval length (sheet interval L2) between the preceding paper P1 and the subsequent paper P2 during the print operation in the contamination suppression setting in this embodiment will be described. The trailing end voltage in the contamination suppression setting is set so that the potential difference between the surface (charge potential) of the photosensitive member 2 and the transfer roller 8 during the paper tailing end control in the normal setting is made smaller than the potential difference between the surface (charge potential) of the photosensitive member 2 and the transfer roller 9 during the transfer. However, the potential difference between the surface (charge potential) of the photosensitive member 2 and the transfer roller 8 during the paper tailing end control in the contamination suppression setting is larger than the potential difference between the surface (charge potential) of the photosensitive member 2 and the transfer roller 8 during the paper tailing end control in the normal setting. Therefore, in this embodiment, during the print operation in the contamination suppression setting a feeding timing of the recording material P is controlled so that the sheet interval L2 is longer than the peripheral length L1 of the photosensitive member 2 (L0<L2). Thus, when the sheet interval length L2 is made longer than the peripheral length L0 of the photosensitive member 2, the surface of the photosensitive member 2 contacting the trailing end of the preceding paper P1 is once subjected to the non-image forming region, which is the sheet interval (region), after passing through the transfer nip N, and then is subjected to the image forming region of the subsequent paper P2. That is, the number of times when the surface of the photosensitive member 2 contacted the trailing end of the preceding paper P1 passes through the charging position by the charging roller 3 until the photosensitive member surface is subjected to subsequent image formation is a plurality of times (twice in this embodiment). By increasing the number of times when the surface of the photosensitive member 2 is charged until the photosensitive member surface is subjected to the subsequent image formation, the potential non-uniformity of the surface of the photosensitive member 2 caused due to the peeling discharge can be reduced, preferably can be eliminated, so that the occurrence of the trailing end memory can be suppressed.

4. Evaluation Test

A result of an evaluation test of the trailing end memory and the paper end contamination conducted in this embodiment (embodiment 2) and comparison examples 2 and 3 will be described.

In this evaluation test, a jam was forcedly caused to occur during transfer of said image and then continuous image formation of a half-tone image for which the trailing end memory is easily detected was carried out, and occurrence or non-occurrence of each of the trailing end memory and the paper end contamination was checked. As the recording material P, paper ("REDLABEL", 80 g/$m^2$ (trade name), manufactured by Canon K.K.) was used. In the comparison example 2, the setting of the voltage applied to the transfer roller 8 is always the normal setting even after the occurrence of the jam, and the sheet interval was kept at L1 (<L0). Further, in the comparison example 3, although the setting of the voltage applied to the transfer roller 8 was switched to the contamination suppression setting after the jam occurrence similarly as in this embodiment, the sheet interval was kept at L1 (<L0). In a table 2, the occurrence or non-occurrence of each of the trailing end memory and the paper end contamination on the recording materials from a first sheet to a 10th sheet in the continuous image formation in this embodiment (embodiment 2) and the comparison examples 2 and 3 is shown.

TABLE 2

| | TV*1 | SI*2 | TEM*3 | PEC*4 |
|---|---|---|---|---|
| EMB. 1 | POSITIVE | L2 | Not occurred | Not occurred |
| COMP. EX. 2 | NEGATIVE | L1 | Not occurred | Occurred |
| COMP. EX. 3 | POSITIVE | L1 | Occurred | Not occurred |

*1"TV" represents the polarity of the transfer voltage in the paper tailing end control.
*2"SI" represents the sheet interval.
*3"TEM" represents the occurrence or non-occurrence of the trailing end memory.
*4"PEC" represents the occurrence or non-occurrence of the paper end contamination.

In this embodiment (embodiment 2), after the occurrence of the jam, as the setting of the voltage applied to the transfer roller 8, the contamination suppression setting was applied, and a positive voltage was applied to the transfer roller 8 when a trailing end of the recording material P passes through the transfer nip N. By this, the paper end contamination did not occur. Further, in this embodiment, during the print operation in the contamination suppression setting, the sheet interval was set at L2 (>L0). By this, the trailing end memory did not occur.

In the comparison example 2, the normal setting was applied as the setting of the voltage applied to the transfer roller 8 even after the jam occurrence, so that the negative voltage was applied to the transfer roller 8 when the trailing end of the recording material P passes through the transfer nip N. For that reason, although the occurrence of the trailing end memory was able to be suppressed, the paper end contamination occurred. As a result, in the comparison example 2, the suppression of the trailing end memory and the suppression of the paper end contamination were not able to be compatibly realized.

In the comparison example 3, the contamination suppression setting was applied as the setting of the voltage applied to the transfer roller 8 after the jam occurrence, so that the positive voltage was applied to the transfer roller 8 when the trailing end of the recording material P passed through the transfer nip N. For that reason, the paper end contamination was able to be suppressed. However, in the comparison example 3, the sheet interval during the print operation in the contamination suppression setting was kept at L1 (<L0). For that reason, the number of times when a potential non-uniformity portion due to the peeling discharge of the surface of the photosensitive member 2 is charged is only once, so that an effect of uniformizing the surface potential of the photosensitive member 2 becomes insufficient and thus the trailing end memory occurred in some instances. As a result, in the comparison example 3, the suppression of the trailing end memory and the suppression of the paper end contamination were not able to be compatibly realized in some cases.

Thus, in this embodiment, the controller 100 is capable of changing a rotation distance (corresponding to the sheet interval distance) of the photosensitive member 2, to a first distance and a second distance longer than the first distance, from the time when the trailing end of a first recording material P1 with respect to the feeding direction of the recording material P reaches the transfer portion N to the time when the leading end of a second recording material P2 subsequent to the first recording material P1 with respect to the recording material feeding direction reaches the transfer portion N in the case where the toner images are continuously transferred onto the first recording material P1 and the second recording material P2 subsequent to the first recording material P1, and the controller 100 changes the above-described rotation distance to the first distance in the case where the first trailing end voltage (trailing end voltage in the normal setting) is applied when the trailing end of the first recording material P1 with respect to the feeding direction passes through the transfer portion N and to the second distance in the case where the second trailing end voltage (trailing end voltage in the contamination suppression setting) is applied when the trailing end of the first recording material P1 with respect to the feeding direction passes through the transfer portion N. In this embodiment, the first distance is shorter than the peripheral length of the photosensitive member 2, and the second distance is longer than the peripheral length of the photosensitive member 2. Further, in this embodiment, the number of times when the region of the surface of the photosensitive member 2 contacting the trailing end of the first recording material P1 with respect to the feeding direction passes through the charging position, where the photosensitive member surface is charged by the charging means 3, until the photosensitive member surface region provides the image forming region in which the toner image to be transferred onto the second recording material P2 is capable of being formed is larger in the case where the rotation potential is the second distance than in the case where the rotation distance is the first distance.

As described above, according to this embodiment, in the print operation after the jam occurrence, the positive voltage is applied to the transfer roller 8 when the trailing end of the recording material P passes through the transfer nip N, so that the negative toner is held on the transfer roller 8. At the same time, in the print operation after the jam occurrence, the sheet interval is extended so as to become the peripheral length or more of the photosensitive member 2. By this, it becomes possible to suppress the paper end contamination and the trailing end memory.

Next, another embodiment (embodiment 3) of the present invention will be described. Basic constitution and operation of an image forming apparatus of this embodiment are the same as those of the image forming apparatuses of the embodiments 1 and 2. In the image forming apparatus of this embodiment, elements having the same or corresponding functions or constitutions to those of the image forming apparatuses of the embodiments 1 and 2 will be omitted from detailed description by adding the same reference numeral or symbols as those in the embodiments 1 and 2.

In the embodiment 2, during the printing in the contamination suppression setting, the sheet interval is always extended, and therefore, depending on the image formed on the subsequent paper P2, there is a possibility that productivity of the image forming apparatus 1 is unnecessarily lowered. Therefore, in this embodiment, the controller 100 acquires image information of the image formed on the subsequent paper P2 by a data processing portion in the video controller 110 as an image information detecting means. Further, from the image information, the controller 100 acquires the image information of the image formed in a position (region) where there is a possibility of the occurrence of the trailing end memory of the subsequent paper P2. Then, on the basis of the image information on the position, the controller 100 changes the length of the sheet interval between the preceding paper P1 and the subsequent paper P2 during the print operation in the contamination suppression setting. By this, it is possible to suppress that the productivity of the image forming apparatus 1 unnecessarily lowered. Particularly, in this embodiment, the controller 100 changes the length of the sheet interval between the preceding paper P1 and the subsequent paper P2 on the basis of the presence or absence of the image in the above-described position. However, the controller 100 may only be required to change the length of the sheet interval between the preceding paper P1 and the subsequent paper P2 on the basis of information on a toner amount of the image in the above-described position (such as an application amount or a coverage). For example, in the case where the toner amount of the image in the above-described position is a predetermined threshold or more, control similar to the control in the case where the image in this embodiment is present can be carried out, and in the case where the toner amount of the image in the above-described position is less than the predetermined threshold, control similar to the control in the case where the image in this embodiment is absent can be carried out.

FIG. 8 is a schematic view showing a relationship between a trailing end position P1*e* of the preceding paper P1 and a position M where there is a possibility that the trailing end memory in the subsequent paper P2 occurs. In FIG. 8, an arrow S represents the feeding direction of the recording material P, L0 represents the peripheral length of the photosensitive member 2, and L1 represents the sheet interval (in the case where the normal setting is applied). There is a possibility that the trailing end memory occurs in the position N spaced from the trailing end position P1*e* of the preceding paper P1 by the peripheral length L0 of the photosensitive member P1. This position is in a position of (L0−L1) from a leading end position of the subsequent paper P2. This position is referred to as a "trailing end memory occurrence position".

In the case where there is no image in the trailing end memory occurrence position, the trailing end memory does not become apparent. That is, this is because even when the potential non-uniformity of the surface of the photosensitive member 2 due to the peeling discharge occurs, there is no image and therefore exposure by the exposure device 4 is not carried out, and thus the surface potential of the photosensitive member 2 originally does not lower close to the developing potential.

Therefore, in this embodiment, during the print operation in the contamination suppression setting, the controller 100 discriminates whether or not the image is present in the trailing end memory occurrence position M of the subsequent paper P2, on the basis of the image information acquired by the data processing portion in the video controller 110. Then, in the case where the image is absent in the trailing end memory occurrence position M, the controller 100 adjusts an image forming timing of the subsequent paper P2 so that the sheet interval is not extended to L2 but is kept at L1. By this, it is possible to suppress that the productivity of the image forming apparatus 1 unnecessarily lowers.

FIG. 9 is a flowchart for illustrating processing of selecting the setting of the voltage applied to the transfer roller 8 and the sheet interval length in the print operation. When the print operation is started, the controller 100 discriminates whether or not the count value is 0 (S201). In the case where the controller 100 discriminated in S201 that the count value is not 0, the controller 100 discriminates whether or not the image is present in the trailing end memory occurrence position M of the subsequent paper P2, on the basis of the image information acquired by the data processing portion in the video controller 110 (S202). Incidentally, in this embodiment, in consideration of tolerances and fluctuations in dimensions of respective component parts, the controller 100 discriminates in S202 that the image is present in a region of 2.5 mm with a width of 5 mm on each of sides upstream and downstream of the trailing end memory occurrence position M of the subsequent paper P2 with respect to the feeding direction of the recording material P. Further, in the case where the controller 100 discriminated in S202 that the image is present, the controller 100 carries out image formation in the contamination suppression setting in which the sheet interval is extended to L2 (>L0) (S203). Thereafter, the controller 100 causes the counter to decrease the count value by 1 (S204), and then discriminates whether or not the recording material P on which the image is last formed is last paper (last recording material) (S205). In the case where the controller 100 discriminated in S205 that the recording material P is the last paper, the controller 100 ends the print operation, and in the case where the controller 100 discriminated in S205 that the recording material P is not the last paper, the sequence returns to the processing of S201.

On the other hand, in the case where the controller 100 discriminated in S202 that the image is absent, the controller 100 carries out the image formation in the contamination suppression setting in which the sheet interval is not extended but is kept at L2 (<L0) (S206), and the sequence goes to S204.

Further, in the case where the controller 100 discriminated in S201 that the count value is 0, the controller 100 carries out the image formation with the sheet interval length L1 (<L0) in the normal setting (S207), and the sequence goes to processing of S205.

Thus, in this embodiment, on the basis of the information of the toner image transferred onto the second recording material P2, the controller 100 is capable of changing a rotation distance (corresponding to the sheet interval distance) of the photosensitive member 2, to a first distance and a second distance longer than the first distance, from the time when the trailing end of a first recording material P1 with respect to the feeding direction of the recording material P reaches the transfer portion N to the time when the leading end of a second recording material P2 subsequent to the first recording material P1 with respect to the recording material feeding direction reaches the transfer portion N in the case where the toner images are continuously transferred onto the first recording material P1 and the second recording material P2 subsequent to the first recording material P1 and where the second trailing end voltage (trailing end voltage in the contamination suppression setting) is applied when the trailing end of the first recording material P1 with respect to the feeding direction passes through the transfer portion N. In this embodiment, in the case where the above-described rotation distance is the first distance, the controller 100 discriminates whether or not the toner image transferred onto the second recording material P2 is formed in a region of the surface of the photosensitive member 2 contacting the trailing end of the first recording material P1 with respect to the feeding direction, and the controller 100 changes the rotational distance to the second distance in the case where the toner image is formed and changes the rotation distance to the first distance in the case where the toner image is not formed. The first distance is substantially equal to a rotational distance of the photosensitive member 2 (corresponding to the sheet interval length) from the time when the trailing end of the first recording material P1 with respect to the feeding direction reaches the transfer portion N to the time when the leading end of the second recording material P2 with respect to the feeding direction reaches the transfer portion N in the case where the first trailing end voltage (trailing end voltage in the normal setting) is applied when the trailing end of the first recording material P1 with respect to the feeding direction passes through the transfer portion N.

As described above, according to this embodiment, the length of the sheet interval between the preceding paper P1 and the subsequent paper P2 is changed on the basis of the image information of the image formed on the subsequent paper P2. By this, it is possible to suppress not only the occurrence of the trailing end memory during the print operation in the contamination suppression setting but also the unnecessary lowering in productivity of the image forming apparatus 1.

Next, another embodiment (embodiment 4) of the present invention will be described. Basic constitution and operation of an image forming apparatus of this embodiment are the same as those of the image forming apparatuses of the embodiments 1 and 2. Accordingly, in the image forming apparatus of this embodiment, elements having the same or corresponding functions or constitutions to those of the image forming apparatuses of the embodiments 1 and 2 will be omitted from detailed description by adding the same reference numeral or symbols as those in the embodiments 1 and 2.

In the embodiment 2, after the jam occurrence, the contamination suppression setting is always applied as the setting of the voltage applied to the transfer roller 8, and therefore, depending on a situation during the jam occurrence, there is a possibility that productivity of the image forming apparatus 1 is unnecessarily lowered. Therefore, in this embodiment, the controller 100 estimates a deposition amount of contamination toner on the transfer roller 8 on the basis of image information of the image, on the photosensitive member 2 or the recording material P when the jam occurred, acquired by a data processing portion in the video controller 110 as an image information detecting means. Then, on the basis of the estimated deposition amount of the contamination toner on the transfer roller 8, the controller 100 changes setting of the voltage applied to the transfer roller 8 (and the sheet interval length). By this, it is possible to suppress that the productivity of the image forming apparatus 1 unnecessarily lowers.

In this embodiment, a count value is set, and on the basis of the count value, either one of the normal setting and the contamination suppression setting is applied as the setting of the voltage applied to the transfer roller 8. In this embodiment, the count value is a value indicating the number of sheets (the number of sheets subjected to the image formation (print number)) of the recording materials on which the images are formed until the setting of the voltage applied to the transfer roller 8, determined on the basis of the deposition amount of the contamination toner on the transfer roller 8 estimated from an image coverage (ratio) is returned from the contamination suppression setting to the normal setting. Incidentally, in this embodiment, similarly as in the embodiment 1, when the jam occurs and the count value is set, the count value is decreased by 1 every time when a single recording material P (sheet) passes through the transfer nip N (i.e., every time when the image is formed on the single sheet). Then, when the count value becomes 0, the setting of the voltage applied to the transfer roller 8 is returned from the contamination suppression setting to the normal setting.

Here, the image coverage is a ratio of covering of the surface of the photosensitive member 2 with the toner in the image forming region in which the toner on the photosensitive member 2 is deposited (i.e., in the image forming region which passes through the developing position on the photosensitive member 2 by the developing device 5) from the occurrence of the jam until the feeding of the recording material P is stopped. In this embodiment, the image coverage is acquired by being calculated by the data processing portion in the video controller 110 on the basis of the image information inputted from the external device 200 such as the host computer. Specifically, the data processing portion in the video controller 110 calculates, as the image coverage, a ratio of the number of image pixels exposed to light by the exposure device 4 to the number of all the image pixels in the image forming region passed through the developing position on the photosensitive member 2.

The contamination of the transfer roller 8 changes depending on the image coverage during the jam occurrence, and the contamination toner is gradually decreased by being deposited on the back surface of the recording material with passing of the recording material P through the transfer nip N.

Therefore, in this embodiment, the print number (count value) in the contamination suppression setting is determined on the basis of a contamination degree of the transfer roller 8 estimate from the deposition amount of the contamination toner on the transfer roller 8. By this, the number of times of the execution of the print operation in the contamination suppression setting is minimized, so that it becomes possible to suppress the unnecessary lowering in productivity of the image forming apparatus 1.

With an increasing image coverage, there is an increasing possibility that the transfer roller 8 is contaminated. For that reason, in this embodiment, the print number (count value) in the contamination suppression setting is changed on the basis of the image coverage during the jam occurrence. Specifically, in the case where the image coverage during the jam occurrence is large, a numerical value of the count value is set at a large value so as to increase the print number in the contamination suppression setting.

In this embodiment, this count value was set through an experiment. Specifically, in the case where the image coverage was 10%, the paper end contamination did not occur. In the case where the image coverage was 30%, the paper end contamination disappeared by image formation of 20 sheets. In the case where the image coverage was 60%, the paper end contamination disappeared by image formation of 60 sheets. In the case where the image coverage was 100%, the paper end contamination disappeared by image formation of 120 sheets.

Accordingly, in this embodiment, in the case where the jam occurred, as shown in a table 3 below, the count value was set on the basis of an image coverage X during the jam occurrence.

TABLE 3

| IMAGE COVERAGE X | COUNT VALUE |
|---|---|
| 0% ≤ X ≤ 10% | 0 |
| 10% < X ≤ 30% | 20 |
| 30% < X ≤ 60% | 60 |
| 60% < X ≤ 100% | 120 |

Thus, in this embodiment, in the case where the rotation of the photosensitive member 2 was stopped in the state in which the image forming operation was not completed, the controller 100 changes the trailing end voltage to the first trailing end voltage (trailing end voltage in the normal setting) after the second trailing end voltage (trailing end voltage in the contamination suppression setting) is applied when the trailing end of the recording material P with respect to the recording material feeding direction passes through the transfer portion for each of sheets (recording materials) in a predetermined number. At this time, in this embodiment, the controller 100 changes the above-described predetermined number of sheets on the basis of information on the toner amount of the toner image on the photosensitive member or the recording material when the rotation of the photosensitive member 2 is stopped in the incompleted state of the image forming operation.

As described above, according to this embodiment, the print number in the contamination suppression setting is determined on the basis of the contamination degree of the transfer roller 8 estimated from the deposition amount of the contamination toner on the transfer roller 8. By this, the lowering in productivity of the image forming apparatus 1 can be kept at a minimum level.

Incidentally, the control in this embodiment was described on the assumption that the control is applied to the image forming apparatus 1 similar to the image forming apparatus 1 in the embodiment 2 (i.e., the count value in this embodiment is used instead of the count value in the embodiment 2). However, the control in this embodiment may be applied to the image forming apparatus 1 similar to the image forming apparatus 1 in the embodiment 1 (i.e., the count value in this embodiment is used instead of the count value in the embodiment 1). In that case, the influence on the life time of the photosensitive member 2 can be suppressed to a minimum level by minimizing the number of times of the execution of the print operation in the contamination suppression setting.

Next, another embodiment (embodiment 5) of the present invention will be described. Basic constitution and operation of an image forming apparatus of this embodiment are the same as those of the image forming apparatuses of the embodiments 1 and 2. Accordingly, in the image forming apparatus of this embodiment, elements having the same or corresponding functions or constitutions to those of the image forming apparatuses of the embodiments 1 and 2 will be omitted from detailed description by adding the same reference numeral or symbols as those in the embodiments 1 and 2.

In the embodiment 2, irrespective of the stop position of the recording material P during the jam occurrence, the same control is applied, and therefore depending on a status during the jam occurrence, there is a possibility that the productivity of the image forming apparatus 1 unnecessarily lowers. Therefore, in this embodiment, on the basis of the stop position of the recording material P during the jam occurrence detected by a stop position detecting means, the controller 100 changes the setting of the voltage applied to the transfer roller 8 (and the sheet interval length). By this, it is possible to suppress that the productivity of the image forming apparatus 1 unnecessarily lowers.

In this embodiment, as the stop position detecting means, the registration sensor 13 or the discharge sensor 18 is used. The controller 100 can predict the stop position of the recording material P during the jam occurrence on the basis of an ON/OFF state of the registration sensor 13 or the discharge sensor 18 or an elapsed time from the ON/OFF state.

The contamination degree of the transfer roller 8 varies depending on the stop position of the recording material P during the jam occurrence. In this embodiment, the contamination degree of the transfer roller 8 during the jam occurrence is defined by dividing such a case into a case 1, a case 2, and a case 3. Parts (a), (b-1), (b-2), (b-3), and (c) of FIG. 10 are schematic views each showing the transfer nip N and the neighborhood thereof for illustrating the case 1 (part (a)), the case 2 (parts (b-1), (b-2) and (b-3)), and the case 3 (part (c)).

Part (a) of FIG. 10 shows a state during the jam occurrence in the case 1. In this case, the jam occurs in a stage in which the recording material P does not reach the transfer nip N and the print operation is stopped. The image forming apparatus 1 performs the print operation on the assumption that the recording material P reaches the transfer nip N, and therefore, the toner T which is to be originally transferred onto the transfer roller 8 is transferred onto the transfer roller 8. For that reason, a deposition amount of the contamination toner on the transfer roller 8 is large. To such a case, specifically, the jam in the case where the recording material P does not reach the registration sensor 13 at an original timing or in the case where arrival of the recording material P at the registration sensor 13 is late corresponds.

Part (b-1) of FIG. 10 shows a state during the jam occurrence in the case 2. In this case, the jam occurs after the recording material P reaches the transfer nip N and the print operation is stopped. In this state, the (unfixed) toner T is transferred on the recording material P. To such a case, specifically, the jam after the recording material P reaches the registration sensor 13 and a predetermined time has elapsed or after arrival of the recording material P at the discharge sensor 18 corresponds.

Part (b-2) of FIG. 10 shows a state after the recording material P is removed by separating the photosensitive member 2 and the transfer roller 8 from each other (after jam clearance) after the jam occurrence of the case 2. The toner remains between the developing position D on the photosensitive member 2 and the transfer nip (transfer position) N. Part (b-3) of FIG. 10 shows a state in which the photosensitive member 2 and the transfer roller 8 are rotated from the state of part (b-2) of FIG. 10. During a rotation operation of the photosensitive member 2 after the jam clearance, the toner T is transferred on the transfer roller 8, and therefore, the transfer roller 8 is contaminated with the toner.

Part (c) of FIG. 10 shows a state during the jam occurrence in the case 3. In this case, the jam occurs after the recording material P passes through the transfer nip N and the print operation is stopped. The toner does not remain between the developing position D on the photosensitive member 2 and the transfer nip (transfer position) N, and therefore, the transfer roller 8 is not contaminated. To such a case, specifically, the jam after the recording material P completely passes through the registration sensor 13 and a predetermined time has elapsed or after the recording material P reaches the discharge sensor 18 and a predetermined time has elapsed corresponds.

The contamination degree of the transfer roller 8 is such that the case 1 is highest, and subsequently, the case 2 and the case 3 follow in the listed order. Therefore, in this embodiment, weighting of the count value is performed on the basis of the stop position of the recording material P during the jam occurrence.

In a table 4 below, count values in the case 1, the case 2, and the case 3 are shown. In this embodiment, these count values were set through an is experiment. Specifically, in the case where the jam was caused to occur during execution of the print operation for forming solid images, in the case 1, the paper end contamination disappeared by image formation of 120 sheets. In the case 2, the paper end contamination disappeared by image formation of 40 sheets. In the case 3, the paper end contamination did not occur.

TABLE 4

| JOP*[1] | COUNT VALUE |
|---|---|
| CASE 1 | 120 |
| CASE 2 | 40 |
| CASE 3 | 0 |

*[1]"JOP" is the jam occurrence position.

Thus, in this embodiment, in the case where the rotation of the photosensitive member 2 was stopped in the state in which the image forming operation was not completed, the controller 100 changes the trailing end voltage to the first trailing end voltage (trailing end voltage in the normal setting) after the second trailing end voltage (trailing end voltage in the contamination suppression setting) is applied when the trailing end of the recording material P with respect to the recording material feeding direction passes through the transfer portion for each of sheets (recording materials) in a predetermined number. At this time, in this embodiment, the controller 100 changes the above-described predetermined number of sheets on the basis of the stop position of the recording material P when the rotation of the photosensitive member 2 is stopped in the incompleted state of the image forming operation.

As described above, according to this embodiment, the print number in the contamination suppression setting is determined on the basis of the stop position of the recording material P during the jam occurrence. By this, the lowering in productivity of the image forming apparatus 1 can be kept at a minimum level.

Incidentally, the control in this embodiment was described on the assumption that the control is applied to the image forming apparatus 1 similar to the image forming apparatus 1 in the embodiment 2 (i.e., the count value in this embodiment is used instead of the count value in the embodiment 2). However, the control in this embodiment may be applied to the image forming apparatus 1 similar to the image forming apparatus 1 in the embodiment 1 (i.e., the count value in this embodiment is used instead of the count value in the embodiment 1). In that case, the influence on the life time of the photosensitive member 2 can be suppressed to a minimum level by minimizing the number of times of the execution of the print operation in the contamination suppression setting. Further, the control of this embodiment, and the control of the embodiment 3 and the control of the embodiment 4 may be arbitrarily combined with each other.

As described above, the present invention was described based on the specific examples, but the present invention is not limited thereto.

In the above-described embodiments, the case where the transfer member is the transfer roller was described, but the transfer member is not limited to the transfer roller. The transfer member may be constituted by, for example, including a rotatable endless belt contactable to the photosensitive member. On an inner peripheral surface side of this transfer belt, in a position opposing the photosensitive member, a voltage applying member (roller, brush, sheet, or the like) for supplying the transfer voltage to the transfer portion through the transfer belt may be disposed.

Further, in the above-described embodiments, the case where the photosensitive member is the photosensitive drum was described, but the photosensitive member is not limited to the photosensitive drum. The photosensitive member may also be photosensitive belt constituted in an endless belt shape.

According to the present invention, in a constitution in which the trailing end voltage is applied to the transfer member when the trailing end of the recording material passes through the transfer portion, it is possible to suppress the paper end contamination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-152690 filed on Sep. 17, 2021, which is hereby incorporated by reference herein in its entirety.

What is claimed is:

1. An image forming apparatus comprising:

a rotatable photosensitive member;

a charging member configured to electrically charge a surface of said photosensitive member;

a developing member configured to form a toner image by supplying toner to the surface of said photosensitive member;

a transfer member forming a transfer portion in contact with the surface of said photosensitive member and configured to transfer the toner image from the surface of said rotating photosensitive member onto a recording material passing through the transfer portion;

an applying portion configured to apply a voltage to said transfer member; and a controller capable of executing control in which a trailing end voltage, applied to said transfer member by said applying portion when a trailing end of the recording material with respect to a feeding direction of the recording material passes through the transfer portion, is changed, wherein said controller is capable of changing the trailing end voltage to a first trailing end voltage lower than a transfer voltage applied to said transfer member by said applying portion when the toner image is transferred from said photosensitive member to the recording material and to a second trailing end voltage higher than the first trailing end voltage in a direction of an opposite polarity to a normal charge polarity of the toner, and wherein in an image forming operation after rotation of said photosensitive member is stopped in a state in which the image forming operation is not completed, said controller carries out control so that the second trailing end voltage is applied when the trailing end of the recording material with respect to the feeding direction passes through the transfer portion.

2. An image forming apparatus according to claim 1, wherein said controller is capable of executing control in which in a case that toner images are continuously transferred onto a first recording material and a second recording material subsequent to the first recording material, a rotation distance of said photosensitive member from a time when a trailing end of the first recording material with respect to the feeding direction reaches the transfer portion to a time when a leading end of the second recording material with respect to the feeding direction reaches the transfer portion is changed to a first distance and a second distance longer than the first distance, and wherein said controller carries out control so that the rotation distance is the first distance in a case that the first trailing end voltage is applied when the trailing end of the first recording material with respect to the feeding direction passes through the transfer portion and so that the rotation distance is the second distance in a case that the second trailing end voltage is applied when the trailing end of the first recording material with respect to the feeding direction passes through the transfer portion.

3. An image forming apparatus according to claim 2, wherein the first distance is shorter than a circumferential length of said photosensitive member, and the second distance is longer than the circumferential length of said photosensitive member.

4. An image forming apparatus according to claim 2, wherein the number of times that a region of the surface of said photosensitive member contacting the trailing end of the recording material with respect to the feeding direction passes through a charging position where the surface of said photosensitive member is charged by said charging member, until the region of the surface of said photosensitive member forms an image forming region in which the toner image is transferred onto the second recording material is capable of being formed is greater in a case that the rotation distance is the second distance than in a case that the rotation distance is the first distance.

5. An image forming apparatus according to claim 1, wherein said controller is capable of executing control in which in a case that toner images are continuously transferred onto a first recording material and a second recording material subsequent to the first recording material and that the second trailing end voltage is applied when a trailing end of the first recording material with respect to the feeding direction passes through the transfer portion, a rotation distance of said photosensitive member from a time when a trailing end of the first recording material with respect to the feeding direction reaches the transfer portion to a time when a leading end of the second recording material with respect to the feeding direction reaches the transfer portion is changed to a first distance and a second distance longer than the first distance on the basis of information on the toner image transferred onto the second recording material.

6. An image forming apparatus according to claim 5, wherein in a case that the rotation distance is the first distance, said controller discriminates whether or not the toner image transferred onto the second recording material is formed in a region of the surface of said photosensitive member contacting the trailing end of the first recording material with respect to the feeding direction, and wherein said controller carries out control so that the rotation distance is the second distance in a case that the toner image is formed in the region of the surface of said photosensitive member and so that the rotation distance is the first distance in a case that the toner image is not formed in the region of the surface of said photosensitive member.

7. An image forming apparatus according to claim 6, wherein the first distance is substantially the same as a rotation distance of said photosensitive member a from a time when a trailing end of the first recording material with respect to the feeding direction reaches the transfer portion to a time when a leading end of the second recording material with respect to the feeding direction reaches the transfer portion in a case that the first trailing end voltage is applied when the trailing end of the first recording material with respect to the feeding direction passes through the transfer portion.

8. An image forming apparatus according to claim 5, wherein the first distance is shorter than a circumferential length of said photosensitive member, and the second distance is longer than the circumferential length of said photosensitive member.

9. An image forming apparatus according to claim 5, wherein the number of times that a region of the surface of said photosensitive member contacting the trailing end of the recording material with respect to the feeding direction passes through a charging position where the surface of said photosensitive member is charged by said charging member, until the region of the surface of said photosensitive member forms an image forming region in which the toner image is transferred onto the second recording material is greater in a case that the rotation distance is the second distance than in a case that the rotation distance is the first distance.

10. An image forming apparatus according to claim 1, wherein in a case that the rotation of said photosensitive member is stopped in the state in which the image forming operation is not completed, said controller carries out control so that the trailing end voltage is changed to the first trailing end voltage after the second trailing end voltage is applied when the trailing end of each of recording materials in a predetermined number of sheets with respect to the feeding direction passes through the transfer portion.

11. An image forming apparatus according to claim 10, wherein said controller carries out control so as to change the predetermined number of sheets on the basis of information on an amount of the toner on said photosensitive member or the recording material when the rotation of said photosensitive member is stopped in the state in which the image forming operation is not completed.

12. An image forming apparatus according to claim 10, wherein said controller carries out control so as to change the predetermined number of sheets on the basis of a stop position of the recording material when the rotation of said photosensitive member is stopped in the state in which the image forming operation is not completed.

13. An image forming apparatus according to claim 1, wherein the first trailing end voltage is of the same polarity as the normal charge polarity of the toner.

14. An image forming apparatus according to claim 1, wherein an absolute value of the second trailing end voltage is lower than an absolute value of the transfer voltage.

15. An image forming apparatus according to claim 1, wherein the case that the rotation of said photosensitive member is stopped in the state in which the image forming operation is not completed includes a case that the rotation of said photosensitive member is stopped in at least one of a state in which the toner image is on said photosensitive member and a state in which the toner image transferred from said photosensitive member onto the recording material remains unfixed on the recording material.

* * * * *